(12) United States Patent
Sahai et al.

(10) Patent No.: US 7,164,736 B2
(45) Date of Patent: Jan. 16, 2007

(54) SYNTHESIZING COHERENT CORRELATION SUMS AT ONE OR MULTIPLE CARRIER FREQUENCIES USING CORRELATION SUMS CALCULATED AT A COURSE SET OF FREQUENCIES

(75) Inventors: Anant Sahai, San Mateo, CA (US); John Tsitsiklis, Lexington, MA (US)

(73) Assignee: SiRF Technology, Inc., San Jose, CA (US)

( * ) Notice: Subject to any disclaimer, the term of this patent is extended or adjusted under 35 U.S.C. 154(b) by 767 days.

(21) Appl. No.: 09/888,227

(22) Filed: Jun. 22, 2001

(65) Prior Publication Data
US 2003/0156664 A1 Aug. 21, 2003

(51) Int. Cl.
H04L 27/06 (2006.01)
(52) U.S. Cl. .................................................. 375/343
(58) Field of Classification Search ............ 375/142, 375/150, 343, 152, 137; 342/109, 378
See application file for complete search history.

(56) References Cited

U.S. PATENT DOCUMENTS

| | | | |
|---|---|---|---|
| 4,578,678 A | 3/1986 | Hurd | |
| 4,701,934 A | 10/1987 | Jasper | 375/1 |
| 5,272,446 A | 12/1993 | Chalmers et al. | |
| 5,566,202 A * | 10/1996 | Lang | 375/149 |
| 5,663,734 A | 9/1997 | Krasner | 342/357 |
| 5,781,156 A | 7/1998 | Krasner | 342/357 |
| 5,841,396 A | 11/1998 | Krasner | 342/357 |
| 5,847,678 A * | 12/1998 | Tachita | 342/357.03 |
| 5,884,214 A | 3/1999 | Krasner | 701/207 |
| 5,963,593 A * | 10/1999 | Kaku et al. | 375/233 |
| 6,327,473 B1 | 12/2001 | Soliman et al. | 455/456 |
| 6,628,969 B1 * | 9/2003 | Rilling | 455/561 |
| 6,735,243 B1 * | 5/2004 | Akopian | 375/150 |
| 6,810,072 B1 | 10/2004 | Akopian | |

FOREIGN PATENT DOCUMENTS

| | | |
|---|---|---|
| EP | 0 892 528 | 1/1999 |
| EP | 1 152 546 | 11/2001 |
| WO | WO 00/014568 | 3/2000 |

OTHER PUBLICATIONS

Tsui, James Bao-Yen, "Fundamentals of Global Positioning System Receivers: A Software Approach," Wiley, 2000, pp. 149-150.

Psiaki, Mark L., "Block Acquisition of Weak GPS Signals in a Software Receiver," Cornell University Presented at ION GPS 2001, Sep. 11-14, 2001, Salt Lake City, pp. 1-13.

(Continued)

Primary Examiner—Khanh Tran
Assistant Examiner—Sam K. Ahn
(74) Attorney, Agent, or Firm—MacPherson Kwok Chen & Heid LLP

(57) ABSTRACT

Techniques are provided for synthesizing a long coherent I and Q correlation integral at a particular frequency by synthetically combining a sequence of shorter correlation integrals at the same or different frequency. Techniques are also provided for acquiring a carrier-modulated signal with an unknown shift of the carrier frequency, and possibly some additional unknown signal parameters. These techniques involve synthesizing coherent correlation sums at a fine frequency resolution, using coherent correlation sums that are calculated at a coarse frequency resolution. This approach allows for coherent processing of the received signal over an arbitrarily long time interval, while avoiding the excessive computational requirements of traditional methods.

55 Claims, 10 Drawing Sheets

OTHER PUBLICATIONS

Zakharov, Y.V.; Baronkin, V.M.; Tozer, T.C. "DFT-based frequency estimators with narrow acquisition range" IEE Proc. Commun., vol. 148, No. 1, Feb. 2001, pp. 1-7.

Grant, P.M.; Spangenberg, S.M.; Scott, I.; McLaughlin, S.; Povey, G.J.R.; Cruickshank, D.G.M. "Doppler estimation for fast acquisition in spread spectrum communications systems" 1998 IEEE, pp. 106-110.

Agarwal, Nainesh et al "Algorithms for GPS Operation Indoors and Downtown" GPS Solutions (2002) 6:149-160; XP-002339507, pp. 149-160.

Psiaki, Mark L. "Block Acquisition of Weak GPS Signals in a Software Receiver" ION GPS 2001, Sep. 11-14, 2001, Salt Lake City, UT, XP-002339506, pp. 1-13.

* cited by examiner

SYNTHESIZING COHERENT CORRELATION SUMS AT ONE OR MULTIPLE CARRIER FREQUENCIES USING CORRELATION SUMS CALCULATED AT A COURSE SET OF FREQUENCIES

FIELD OF THE INVENTION

The present invention relates to signal processing and, more particularly, to techniques for synthesizing coherent correlation sums at a fine frequency resolution using coherent correlation sums that are calculated at a coarse frequency resolution.

BACKGROUND OF THE INVENTION

In general, when a carrier-modulated signal is received by a receiver, the carrier frequency of the signal is shifted by an unknown amount, due to clock drift at the receiver and/or a Doppler shift due to motion. Further, the known signal may be delayed by an unknown amount of time in the course of traveling from the source to the receiver. The signal that is received at the receiver is generally referred to as the received signal, and it typically includes noise. For many applications, one needs to determine the shift of the carrier frequency to a high degree of accuracy in order to be able to estimate some of the signal parameters such as the signal delay or the data that are being communicated through the signal.

In one approach for estimating the carrier frequency, known as coherent processing, multiple candidate carrier frequencies are examined. For each candidate frequency, In Phase ("I") and Quadrature ("Q") correlation sums are calculated, followed by an evaluation of the sum of squares $I^2+Q^2$. The candidate frequency that results in the largest sum of squares is selected as the estimated carrier frequency. If the delay is an unknown quantity, then a two-dimensional search is performed to simultaneously estimate the delay and carrier frequency.

A significant disadvantage to the above approach is that the computational expense in performing the calculations for the various candidate frequencies can be prohibitively high. This is because the number of candidate frequencies that have to be examined must increase in proportion to the duration of the signal and therefore in proportion to the number N of available samples of the received signal. Consequently, the overall computational effort is of the order of at least $N^2$.

In another approach, the signal is broken into multiple short blocks, each block is processed coherently as above, and then the values of $I^2+Q^2$ calculated from the different blocks are added. This approach, known as non-coherent processing, can work with a smaller number of candidate frequencies, compared to coherent processing. On the other hand, it is much more sensitive to noise. Therefore, in order to maintain a constant level of performance, more signal samples are required and the overall computational effort remains high. Based on the foregoing, there is a clear need for a Technique for synthesizing coherent correlation sums at a fine frequency resolution using coherent correlation sums that are calculated at a coarse frequency resolution that requires less computational expense.

Problem Statement

The general problem of estimating an unknown shift in the carrier frequency of a received signal is as follows. Given a sequence of N real numbers, denoted by $x_1, \ldots, x_N$, the following expression is to be evaluated (exactly or approximately):

$$C(f) = \sum_{k=1}^{N} x_k e^{2\pi j f k \Delta}, \quad (1)$$

for a plurality of frequencies f in a given range $$F_1 \leq f \leq F_2.$$

Herein, j is used to denote the square root of −1, that is, $j = \sqrt{-1}$. Also, $\Delta$ is a known constant that represents the spacing in time between consecutive numbers $x_k$. Note that C(f) is complex-valued. The real and imaginary parts of C(f) are known as In Phase (I) and Quadrature (Q) correlation sums, respectively.

In a variant of the problem, it is desired to maximize $|C(f)|^2$, commonly referred to as the "ambiguity function," over the given frequency range. This maximization problem is typically solved by evaluating $|C(f)|^2$ over a densely-spaced grid of candidate values of f, and selecting that value of f for which $|C(f)|^2$ is largest. This procedure finds the maximum over the chosen grid. However, when the grid spacing is small and the function C(f) is smooth, the results of this search provide a very close approximation to the search over the entire range $[F_1, F_2]$ of frequencies. In another variant, one may seek to identify values of f for which $|C(f)|^2$ exceeds a certain threshold.

In a further variant of the problem, the numbers $x_k$ depend, in a known manner, on an additional unknown parameter $\sigma$, and are denoted by $x_k(\sigma)$ to make this dependence explicit. In this variant, the problem consists of calculating the correlation sum $$C(f, \sigma) = \sum_{k=1}^{N} x_k(\sigma) e^{2\pi j f k \Delta}, \quad (2)$$

for various values of the pair $(f, \sigma)$ or of maximizing $C(f, \sigma)$ over a given range of $(f, \sigma)$ pairs.

In another variant, the parameter a can take integer values within a given range $M = \{0, 1, 2, \ldots, M-1\}$ and $x_k(\sigma)$ is of the form $$x_k = y_k s_{k-\sigma},$$

for some known sequences $y_k$ and $s_l$, resulting in $$C(f, \sigma) = \sum_{k=1}^{N} y_k s_{k-\sigma} e^{2\pi j f k \Delta}. \quad (3)$$

In a special case of the problem one may wish to calculate the correlation sum for a single choice or for very few choices of f, but do this in a computationally efficient manner that makes use of correlation sums that have already been computed for frequencies that differ from the frequencies that are of interest. This situation can arise in a number of ways. In some cases, the signal is broken into blocks and correlation sums are automatically computed at the receiver, e.g., by a bank of analog or digital correlators, at a preset set of frequencies. One may want to make computationally efficient use of the available block correlation sums to synthesize the desired correlation sums over the entire duration of the signal. In some cases, the raw data may be unavailable, so that such a synthesis of long correlation sums on the basis of short correlation sums is the only option available. In other cases, an algorithm may have already computed correlation sums for certain values of f, and of particular interest are the correlation sums for a nearby value of f.

As another variant, one may want to compute a correlation sum of a more general form, such as $$C(f,\sigma) = \sum_{k=1}^{N} y_k s_k(\sigma) e^{2\pi j f k \Delta + j\theta_k}, \quad (4)$$

or $$C(f,\sigma) = \sum_{k=1}^{N} y_k s_{k-\sigma} e^{2\pi j f k \Delta + j\theta_k}, \quad (5)$$

where $\theta_k$ is a known phase term that changes slowly with time.

Origins of the Problem

The above stated problem arises during the acquisition of a carrier-modulated signal that has been distorted by an unknown shift of its carrier frequency. In this subsection, a summary description of this particular context is provided.

A receiver receives a signal of the form $$y(t)=\alpha s(t;\sigma)\cos(2\pi(f_0+f^*)t+\theta(t)+\phi^*)+w(t) t \in [0,T].$$

Here, t stands for time, T is the total duration of the signal, $f_0$ is a known carrier frequency, f* is an unknown shift of the carrier frequency, $\theta(t)$ is an additional known phase term, $\phi^*$ is the typically unknown phase of the modulating signal, and w(t) represents noise. Furthermore, $\alpha$ is a usually unknown constant which is proportional to the square root of the power of the received signal, and s(t; $\sigma$) stands for the baseband form of the received signal, in the absence of noise. Finally, $\sigma$ is an unknown parameter that determines the exact form of the signal in the absence of noise. The form of the dependence on $\sigma$ is assumed to be known. That is, if $\sigma$ were known, then the value of s(t; $\sigma$) would be known for every t.

In a digital communications context, s(t; $\sigma$) can be a transmitted waveform, and $\sigma$ can represent the data bits that are being communicated through this waveform. In wireless and satellite communications, including Global Positioning Systems (GPS), $\sigma$ can represent an unknown time delay from the transmitter to the receiver. By letting $\sigma$ be the ratio of the delay to the intersample time $\Delta$, and if this ratio is integer, one obtains that s(t; $\sigma$) is actually of the form s(t−$\sigma\Delta$).

The variable f* represents an unknown frequency shift, which is known to belong to certain range $[F_1, F_2]$. This frequency shift can arise in various ways. A representative but not exclusive list includes receiver motion, transmitter motion, or a clock skew at the transmitter or receiver. A frequency shift due to motion is known as a Doppler shift. The additional but known phase term $\theta(t)$ can arise in a situation where the transmitter or receiver's velocity is changing in a predictable manner. For a specific context, consider a GPS receiver that is operating on data that have been collected over a 1 second interval. During that interval, a satellite that transmits a GPS signal moves considerably, and the satellite motion manifests itself as a Doppler shift of the carrier frequency. In addition, because the satellite does not move on a straight line relative to a stationary receiver but rather follows an elliptical orbit, the velocity of the satellite can change appreciably during the 1 second interval. Such a change in velocity (acceleration) can be modeled as a change in the carrier frequency or equivalently as a slowly changing additional phase term $\theta(t)$. Because the satellite orbit is known, the additional phase term $\theta(t)$ is also known.

In some contexts, the signal is immediately mixed at the receiver from the carrier frequency to an intermediate frequency, in which case the notation $f_0$ in the above formula can be taken to represent the intermediate frequency. In some contexts, the signal is immediately mixed directly to baseband, in which case $f_0$ can be taken equal to zero.

In some cases, the received signal y(t) is analog and is subsequently filtered and sampled. In other cases, the received signal is obtained from an intermediary device in filtered and sampled form. In either case, the result is a discrete sequence of samples of the form $$y_k = s_k(\sigma)\cos(2\pi(f_0+f^*)k\Delta+\theta_k+\phi^*)+w_k.$$

Here, $y_k$, $s_k(\sigma)$, $\theta_k$, and $w_k$ reflect the value of the functions y(t), s(t; $\sigma$), $\theta(t)$ and w(t), or of filtered versions of these functions, at time $k\Delta$, where $\Delta$ is the length of time that elapses between two consecutive samples. Without loss of generality, it is assumed here that the time at which the first sample is taken is $\Delta$, and that T is an integer multiple of $\Delta$. Let N be the total number of samples, which is given by $$N = \frac{T}{\Delta}.$$

A coherent receiver operates as follows. It calculates In-Phase and Quadrature correlation sums of the form $$I(f,\sigma) = \sum_{k=1}^{N} y_k s_k(\sigma) \cos(2\pi f k\Delta + \theta_k),$$

and $$Q(f,\sigma) = \sum_{k=1}^{N} y_k s_k(\sigma) \sin(2\pi f k\Delta + \theta_k),$$

for various pairs (f, $\sigma$), and searches for a pair that results in the largest value of the ambiguity function $$I^2(f, \sigma)+Q^2(f, \sigma).$$

One now defines $x_k=y_k s_k(\sigma)$, and C(f, $\sigma$)=I(f, $\sigma$)+jQ(f, $\sigma$). One then observes that coherent identification of the carrier frequency for a particular candidate value of $\sigma$ coincides with the problem of maximizing $|C(f, \sigma)|^2$, with C(f, $\sigma$) defined in Eq. (4), that is, $$C(f,\sigma) = \sum_{k=1}^{N} y_k s_k(\sigma) e^{2\pi j f k\Delta + j\theta_k}.$$

When σ is the delay in the reception of the signal, that is, if s(t; σ) is of the form s(t−σΔ), then $s_k(\sigma)$ is of the form $s_k(\sigma)=s_{k-\sigma}$. It follows that coherent identification of the carrier frequency for a particular candidate value of σ coincides with the problem of maximizing $|C(f, \sigma)|^2$, with C(f, σ) defined in Eq. (5), that is, $$C(f,\sigma) = \sum_{k=1}^{N} y_k s_{k-\sigma} e^{2\pi j f k\Delta + j\theta_k},$$

When acquiring a signal, one typically needs to perform a two-dimensional search over a set of candidate pairs (f, σ). If the ambiguity function $|C(f, \sigma)|^2$ is large for a particular (f, σ), this is taken as evidence that this particular pair provides a close approximation to the true frequency shift and parameter of the received signal, and the signal is said to be detected or acquired. It is common to combine this approach with a thresholding scheme whereby acquisition is deemed to be successful if the ambiguity function exceeds some threshold.

In some cases, the received signal is analog but is not sampled. The processing of the signal can be carried out in analog form, using for instance analog correlators implemented in hardware. In such cases, all of our previous discussion remains applicable, provided that the sums are replaced throughout by integrals. For ease of exposition, our discussion will focus on the case where the signal is sampled and sums are calculated. However, one skilled in the art would have no difficulty applying this invention to the case where sums are replaced by integrals.

Traditional Methods

In this section, the methods that are traditionally used for carrier frequency estimation are discussed, and their shortcomings are indicated. Before doing so, the number of candidate frequencies that need to be examined are discussed.

The Number of Candidate Frequencies

Since there are infinitely many different frequencies in the range $[F_1, F_2]$, this range has to be discretized so that C(f, σ) is only computed for a finite number of candidate frequencies f, namely those that belong to a suitably constructed grid of frequencies.

Let us take the spacing between successive grid points to be a number $\Delta_f$. One then computes C(f, σ) only for those f of the form $f=F_1+b\Delta_f$, where b is an integer taking values in the range b=0, 1, ..., B. The number B is chosen so that $F_1+B\Delta_f \geq F_2$ and is approximately equal to $$B \approx \frac{F_2 - F_1}{\Delta_f}.$$

With this choice, there is a guarantee that at least one grid point will be within $\Delta_f/2$ from the true frequency f*.

When a grid frequency f is used in place of the true frequency f* the phase term $e^{2\pi j f k\Delta}$ will be different from $e^{2\pi j f^* k\Delta}$. The difference must be kept small enough in order to maintain coherence. For this, it is necessary and sufficient to choose the grid-spacing $\Delta_f$ so that $\Delta_f T$ is smaller than some user-selected threshold 1/n. By setting $$\Delta_f T = \frac{1}{n}, \quad (6)$$

it is obtained that the number B of frequency grid points is approximately $$B \approx \frac{F_2 - F_1}{\Delta_f} = n(F_2 - F_1)T = n(F_2 - F_1)\Delta N.$$

For any given choice of n, it is important to note that the number of frequency grid points increases in proportion to the number N of data samples.

A reasonable choice is to let n=4, which results in a maximum phase error (loss of coherence) smaller than π/4, although other choices are also appropriate. When using a larger value for n, accuracy is somewhat improved, but computational requirements increase because of the larger number B of frequency grid points.

The Standard Method

The most common approach is to evaluate the expression for C(f, σ) separately for each one of the B frequency grid points. If one counts one multiplication and one addition of complex numbers as one operation, this approach requires about NB operations. Since B increases in proportion to N, the computational requirements of this approach are of the order of $N^2$.

If C(f, σ) is to be evaluated for M different values of σ, the above procedure has to be repeated M times, for a total computational effort of MBN.

To put this in perspective, consider the context where 1 second of a received GPS signal, sampled at 4 MHz, is searched. With a frequency shift uncertainty of 1 KHz, and with n=4, one has B=4,000, and $N=4\times10^6$. If one searches for M=1000 possible values of the signal delay, the computational requirements amount to $16\times10^{12}$, just to acquire the signal from a single satellite, which is prohibitively large.

In the further special case where the data $x_k$ are of the form $x_k=y_k s_{k-\sigma}$, some savings are possible. One recognizes that C(f, σ) is the convolution of two sequences, and that the convolution only needs to be computed for M different choices of σ. One can divide the sequences into blocks of length M, calculate convolutions block-by-block and add them at the end. The convolution of two sequences of length M can be calculated by forming the transform of the two sequences, using a Fast Fourier Transform (FFT) algorithm, multiplying the transforms, and then taking an inverse transform. This takes 3cM log M arithmetic operations, where cM log M is the running time of a single FFT or inverse FFT.

The constant c depends on the implementation of the algorithm, but can be assumed to be less than 10. The overall complexity, summing over N/M blocks, and over B frequencies is 3cN B log M. Here and throughout the rest of this document, all logarithms will be taken with respect to base 2.

In all cases, and because B increases linearly with N, the overall computational effort grows as $N^2$.

A Transform-Based Method

There is an alternative to the standard method, which is applicable to the case where the additional time-dependent phase term $\theta_k$ is absent, and which is the subject of U.S. Pat. No. 4,701,934, entitled, "Method of Doppler Searching in A Digital GPS Receiver" by inventor Steven C. Jasper. One notes, that for any fixed σ, the expression for C(f, σ)

$$C(f, \sigma) = \sum_{k=1}^{N} x_k(\sigma) e^{2\pi j f k \Delta}$$

is the same as the definition of the discrete Fourier transform of the sequence $x_k(\sigma)$. Thus, one can take the FFT of the sequence $x_k(\sigma)$ and obtain C(f, σ) for all frequencies that are integer multiples of 1/T. In this case, and with the choice $\Delta_f = 1/(nT)$, as in Eq. (6), one actually needs the transform at a finer frequency resolution, finer by a factor of n. (For example, if n=4, the frequency resolution needs to be finer by a factor of 4.) This resolution can be obtained by taking the original sequence, of length N, and appending (n–1)N zeroes at the end, to obtain a sequence of length nN, and then computing the transform of the longer sequence. The overall complexity of this method is that of forming the FFT of a sequence of length nN, which is cnN log(nN).

For the case of multiple (say, M) candidate signal parameters σ, the process has to be repeated M times, resulting in complexity of cnMN log(nN).

In the special case where $x_k(\sigma) = y_k s_{k-\sigma}$, no further simplification appears possible and the complexity remains cnMN log(nN), which can also be prohibitively large. Furthermore, after performing this method, one does not have a computationally convenient way to adjust the sum to another nearby frequency.

Noncoherent Processing

Another common way of avoiding the need for a large number of candidate frequencies is to process the data record non-coherently. A typical approach is the following. Break the data record $x_1, \ldots, x_N$ into a number $N/N_0$ (assumed integer) of blocks, consisting of $N_0$ data points each. For each data block, use one of the preceding methods to obtain an ambiguity function $|C_i(f, \sigma)|^2$ based on the data in the ith block. One then combines noncoherently the results from the various blocks, to obtain an overall ambiguity function given by $$A(f, \sigma) = \sum_{i=1}^{N/N_0} |C_i(f, \sigma)|^2.$$

This method can be advantageous because coherence only needs to be maintained over intervals of length $N_0 \Delta$ (the length of a block), as opposed to NΔ. Hence, the number of candidate frequencies, and the corresponding computational complexity is reduced by a factor of $N/N_0$. In the absence of noise, this method delivers results comparable to the coherent method with much less computation.

The disadvantage of this method lies in the fact that it is much more sensitive to noise. In many settings, coherent processing is optimal, as far as its statistical properties are concerned. Non-coherent processing suffers a so-called "squaring loss" that results in reduced sensitivity. This loss becomes more pronounced when the signal is weak and a long data record is needed.

The invention described in this application aims at reducing computational requirements for the case of long data records. Long data records are needed mainly when the signal is weak and the signal-to-noise ratio (SNR) is low. In this context, the noise sensitivity of non-coherent processing is very pronounced. For the non-coherent method to achieve a sensitivity comparable to that of the coherent one, the data set would have to be much larger, and there would be no net decrease in computational requirements.

SUMMARY OF THE INVENTION

Techniques are provided for synthesizing a long coherent I and Q correlation sum or integral at a particular frequency by synthetically combining a sequence of shorter correlation sums or integrals at the same or different frequency. Techniques are also provided for acquiring a carrier-modulated signal with an unknown shift of the carrier frequency, and possibly some additional unknown signal parameters. These techniques involve synthesizing coherent correlation sums or integrals at a fine frequency resolution, using coherent correlation sums or integrals that are calculated at a coarse frequency resolution. This approach allows for coherent processing of the received signal over an arbitrarily long time interval, while avoiding the excessive computational requirements of traditional methods.

The method provides an approximation D(f, σ) to the correlation sum $$C(f, \sigma) = \sum_{k=1}^{N} y_k s_k(\sigma) e^{2\pi j f k \Delta + j\theta_k},$$

for various candidate values of the pair (f, σ), and uses these approximate values to acquire the signal, i.e., identify the true value of the carrier frequency and of signal parameter σ. In the special case where σ is a delay parameter, and $s_k(\sigma)$ is of the form $s_{k-\sigma}$, further efficiency improvements are obtained by using Fast Fourier Transform techniques. A similar approximation is provided in the case where it is desired to approximate correlation integrals instead of correlation sums.

The central idea is to synthesize long coherent correlation sums, at a fine set of frequencies, by combining short coherent correlation sums at a coarser set of frequencies. Specifically, if we split the index set $\{1, \ldots, N\}$ into blocks $\{k_i, \ldots, k_{i-1}\}$ and if we calculate short correlation sums $$D_i(f', \sigma) = \sum_{k=k_i}^{k_{i+1}-1} y_k s_k(\sigma) e^{2\pi j f' k \Delta}$$

for some frequency f', and for each block $\{k_i, \ldots, k_{i+1}-1\}$, then we can synthesize a very good approximation D(f, σ) of the long correlation sum C(f, σ) at a nearby frequency f, by letting $$D(f, \sigma) = \sum_i e^{2\pi j(f-f')k_i\Delta + j\theta_{k_i}} D_i(f', \sigma).$$

The resulting approximation D(f, σ) is of the form $$D(f, \sigma) = \sum_{k=1}^{N} y_k s_k(\sigma) e^{2\pi j \phi_f(k)\Delta},$$

where $\phi_f(k)$ is a time-dependent phase such that $|2\pi\phi_f(k)\Delta - 2\pi f k\Delta - \theta_k|$ is small all k. This results in D(f, σ) being a close approximation of C(f, σ). The time-dependent phase of $\phi_f(k)$ has a particular piecewise linear form, and is linear inside each block. In some embodiments, the method includes a procedure that selects certain parameters and a specific choice of $\phi_f(k)$ that optimizes the overall running time.

Performance Losses

With proper choice of the algorithm parameters and of the time-dependent phase $\phi_f(k)$, this method does not suffer from coherence loss any more than the classical approaches do. A justification of this statement follows.

Recall that in classical methods for frequency search, one chooses a frequency grid spacing $\Delta_f$ so that $\Delta_f = 1/nT = 1/(nN\Delta)$, where n is a user-selected parameter. This ensures the following property. For every possible frequency f*, there is a frequency f on the selected grid, for which C(f, σ) is calculated, and for which $|f-f^*| \leq 1/(2nN\Delta)$, resulting in $$|2\pi f k\Delta - 2\pi f^* k\Delta| \leq \frac{2\pi}{2n}, \text{ for all } k.$$

This method will guarantee the following analogous property. For every possible frequency f*, there is a frequency f on the selected grid, for which D(f, σ) is calculated, and for which $$|2\pi\phi_f(k)\Delta - 2\pi f^* k\Delta - \theta_k| \leq \frac{2\pi}{n}, \text{ for all } k.$$

Thus, if one chooses n in the method to be twice as large as the value of n used in a classical method, the method provides an approximation of the true phase $2\pi f^* k\Delta + \theta_k$ that has the same guarantees as those provided by classical methods.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for synthesizing coherent correlation sums or integrals at a fine frequency resolution, using coherent correlation sums or integrals that are calculated at a coarse frequency resolution. This approach allows for coherent processing of the received signal over an arbitrarily long time interval, while avoiding the excessive computational requirements of traditional methods. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Figure 1A:
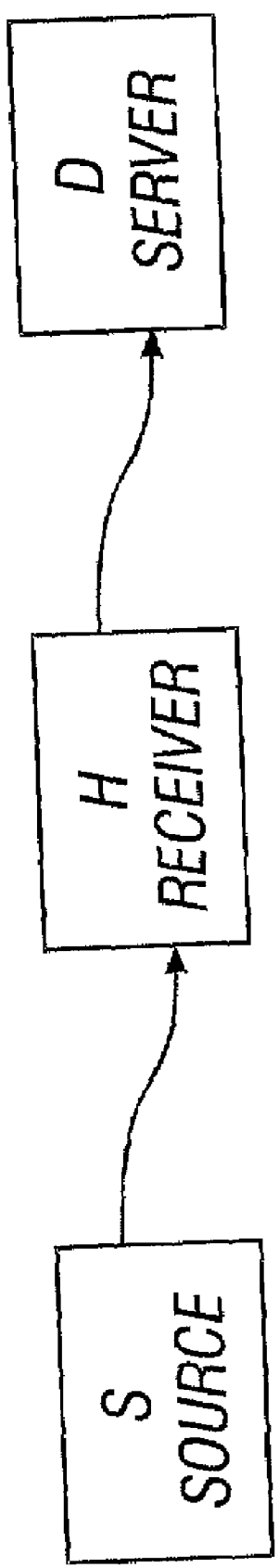
FIG. 1A is a block diagram that illustrates a system overview for processing a signal.

FIG. 1A is a block diagram that illustrates a system overview for processing a signal. The system comprises a signal source S, a receiver H, and a server D. By way of example, the signal source is a machine that produces an analog signal. The analog signal is known, except that it depends on an unknown signal parameter σ in a known manner. The analog signal is transmitted to receiver H. The signal that is received at H is herein referred to as a "received signal". In some embodiments the unknown signal parameter σ is an unknown delay in time from the time the analog signal leaves signal source S and is received at receiver H. In one embodiment of the invention, H converts the analog signal into a sequence of numbers by filtering and then sampling the received signal. The sampled received signal is herein referred to as "sampled data" or simply "data." In one embodiment of the invention, H transmits the sampled data to server D for processing. Further, for the purpose of explanation, assume that the known signal's carrier frequency is modulated by an unknown frequency shift, which may, for example, be due to a clock drift at the receiver, and/or relative motion of the receiver with respect to the signal source. Thus, it is assumed that the sampled data received at server D has an unknown carrier frequency due to the unknown frequency shift, and that the frequency shift belongs to a known frequency range [$F_1$, $F_2$].

The present invention is equally applicable to the case where correlation integrals (instead of correlation sums) are to be computed, possibly in hardware, using an analog received signal, without first sampling the received signal. For ease of exposition, we describe an embodiment for the case where calculations are based on sampled data. However, one skilled in the art would have no difficulty in making the necessary adjustments for the case of an analog received signal.

Figure 1B:
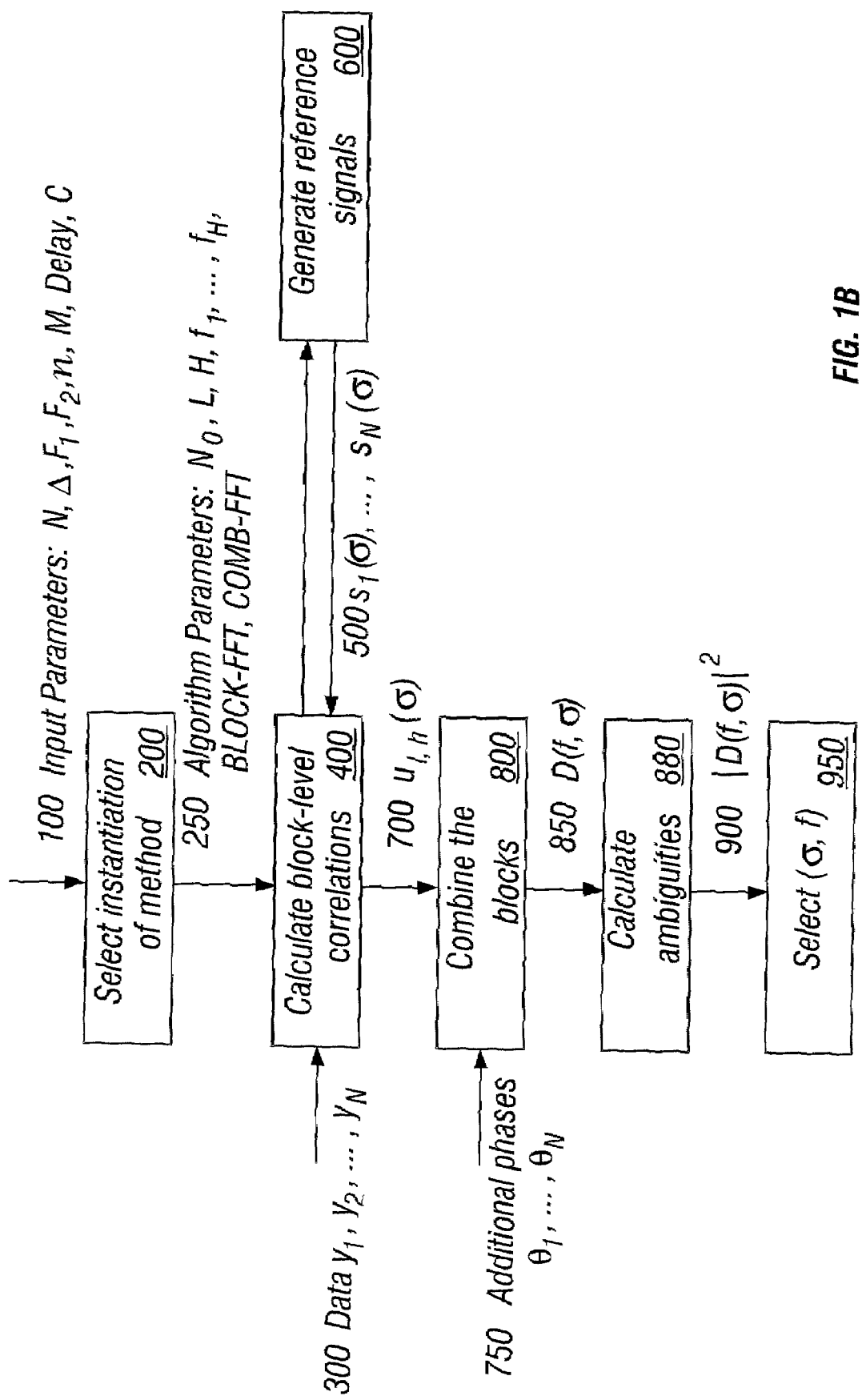
FIG. 1B is a flowchart that illustrates the operational overview of a technique for synthesizing coherent sums and for using them for the purpose of carrier estimation and signal acquisition.

In FIG. 1B as explained herein, the method receives certain input parameters 100, which consist of the following. N is the length of the data record (number of samples) to be processed. $\Delta$ is the real time elapsed between consecutive samples in the data record. $F_1$ and $F_2$ specify the frequency range to be searched; in particular, the set of frequencies f of interest is specified by $F_1 \leq f \leq F_2$. The parameter n is a positive integer that specifies a tolerance parameter for phase errors. Given n, the algorithm will ensure that phase errors due to approximations do not exceed $2\pi/n$ radians. In particular, the method will examine frequencies that belong to a grid, where the distance between consecutive grid points is approximately $1/(nN\Delta)$ Hz. M is a positive integer that specifies the number of different candidate signal parameters $\sigma$ that will be examined. DELAY is a binary parameter. If DELAY is TRUE, the candidate parameters $\sigma$ are integer and the reference signals $s_k(\sigma)$ are of the form $s_{k-\sigma}$, so that $\sigma$ represents time delay. If DELAY is FALSE, then no assumption on the structure of the $s_k(\sigma)$ can be made. In either case, and without loss of generality, one can index the candidate signal parameters $\sigma$ so that they range from 1 to M. The notation $\mathcal{M}=\{1,\ldots,M\}$ is used to refer to the set of candidate c. Finally, $\sigma$ is a positive number that reflects the computational complexity of performing Fast Fourier Transforms (FFTs). In particular, the complexity of performing an FFT or an inverse FFT on a (possibly complex) sequence of length n will be estimated to be cn log n.

FIG. 1B is a flowchart that illustrates the operational overview of a technique for synthesizing coherent sums. The process of block 200 is described in greater detail in FIG. 2C. At block 200 of FIG. 1B, a particular instantiation of the method is selected, so as to optimize its computational requirements. Block 200 receives input parameters 100. The instantiation of the method is specified by certain algorithm parameters 250. These algorithm parameters include the length $N_0$ of the blocks into which the data are broken, the number L of such blocks, the number H of different coarse-grained frequencies that will be considered while processing each block, and the set of these frequencies $f_1, \ldots, f_H$. The latter frequencies form a grid with constant spacing between consecutive grid points. The last algorithm parameters are two binary variables, BLOCK-FFT and COMB-FFT. If BLOCK-FFT is TRUE, then an FFT-based algorithm is to be used during the process at block 400 of processing each block. The details of process at block 400 are described in greater detail in FIG. 4 herein. If COMB-FFT is TRUE, then an FFT-based algorithm is to be used by the process at block 800 of combining the results from the various blocks. The details of process at block 800 is described in further detail in FIG. 6 herein. The data $y_1, \ldots, y_N$ to be processed, shown in block 300, are fed to a process at block 400 that calculates for each block l, for $l=1, \ldots, L$, for each frequency $f_h$ in the set $f_1, \ldots, f_H$, and for each $\sigma$ in the set $\mathcal{M}=\{1, \ldots, M\}$, the block-level correlations at block 700, according to the formula $$u_{l,h}(\sigma) = \sum_{k=(l-1)N_0+1}^{lN_0} y_k s_k(\sigma) e^{2\pi j f_h(k-(l-1)N_0)\Delta}.$$

To carry out this task, the process at block 400 submits requests to a process at block 600 that generates the required values 500 of the reference signals $s_k(\sigma)$. The process at block 600 is described in greater detail in FIG. 5 herein.

The block-level correlations are complex-valued. Their real and imaginary parts are known as I and Q correlation sums. Accordingly, a block-level correlation will also be referred to as a "pair of I and Q correlation values" or as a "pair of I and Q correlation sums" or as a "pair of I and Q correlation integrals."

The process at block 800 first constructs a finite set $\mathcal{F}$ of equispaced fine-grained frequencies to be examined, of cardinality at most LH. These frequencies are constructed by refining the frequency grid $f_1, \ldots, f_H$ of the algorithm parameters 250 by a factor of L, that is, by reducing the spacing between consecutive grid points by a factor of L, while omitting some of the frequencies that fall outside the frequency range $[F_1, F_2]$. A more detailed description of the construction of $\mathcal{F}$ is provided later.

The process at block 800 takes the block-level correlations $u_{l,h}(\sigma)$ as inputs and combines them, by forming weighted sums of the correlation sums $u_{l,h}(\sigma)$, to produce for each frequency f in the set $\mathcal{F}$, and for each candidate signal parameter $\sigma$ in $\mathcal{M}=\{1, \ldots, M\}$, an approximation 850 D(f, $\sigma$) to the correlation sum C(f, $\sigma$), so that $$D(f, \sigma) \approx C(f, \sigma) = \sum_{k=1}^{N} x_k s_k(\sigma) e^{2\pi j f k \Delta + j\theta_k}.$$

These approximate correlation sums are herein also referred to as weighted sums of correlation functions and are squared by the process at block 880 to obtain the approximate ambiguity function 900 $|D(f, \sigma)|^2$, for every $f \in \mathcal{F}$ and every $\sigma \in \mathcal{M}$. Once this approximate ambiguity function becomes available for every $f \in \mathcal{F}$ and every $\sigma \in \mathcal{M}$, a final process at block 950 is used to select a pair (f, $\sigma$) at which the approximate ambiguity is maximized.

In one embodiment, the maximizing pair (f, $\sigma$) is selected when a single best estimate of an unknown frequency and signal parameter is to be reported. However, different embodiments are possible. In some embodiments, the process may quit after process at block 800 and feed the approximate correlation sums D(f, $\sigma$) to some other method for further processing. In other embodiments, the process may quit after process at block 880 and feed the approximate ambiguity function $|D(f, \sigma)|_2$ to some other method for further processing. Such other methods may employ additional side information, or may perform a finer-grained search by interpolating the function D(f, $\sigma$) as described in U.S. patent application Ser. No. 09/888,338, entitled "Extracting Fine-Tuned Estimates from Correlation Functions Evaluated at a Limited Number of Values" by Anant Sahai, John Tsitsiklis, Stefano Casadei, Andrew Chou, Benjamin Van Roy and Jesse Robert Stone, filed on the same day herewith. Finally, in some embodiments, the process at block 950 may select all pairs (f, $\sigma$) that exceed a certain threshold. Or the process at block 950 may select a fixed number of pairs (f, σ) with the highest ambiguity values, for further processing.

Figure 2A:
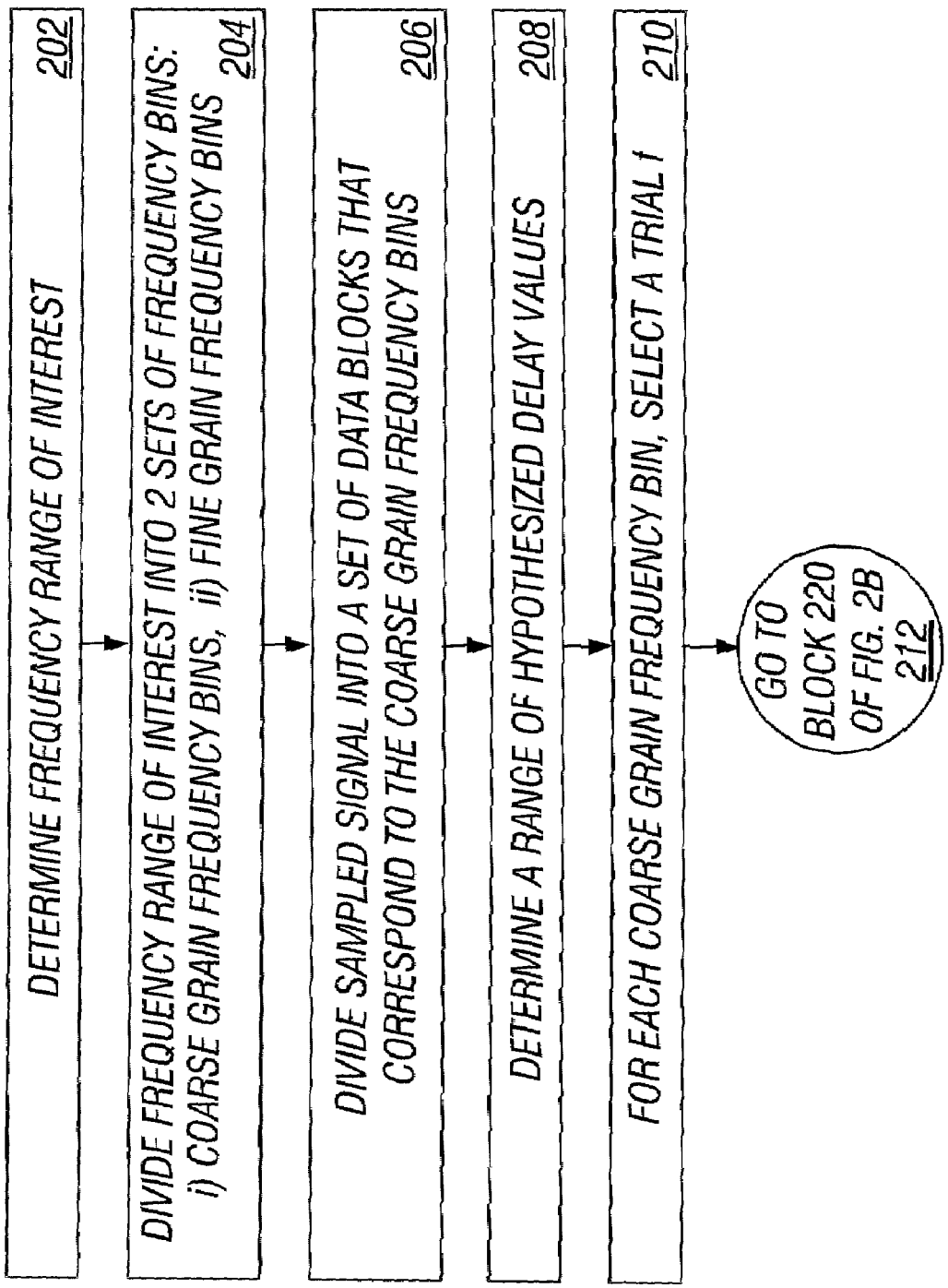
FIG. 2A and FIG. 2B are flowcharts that provide an alternative illustration of a technique for estimating the carrier frequency of a received signal.
Figure 2B:
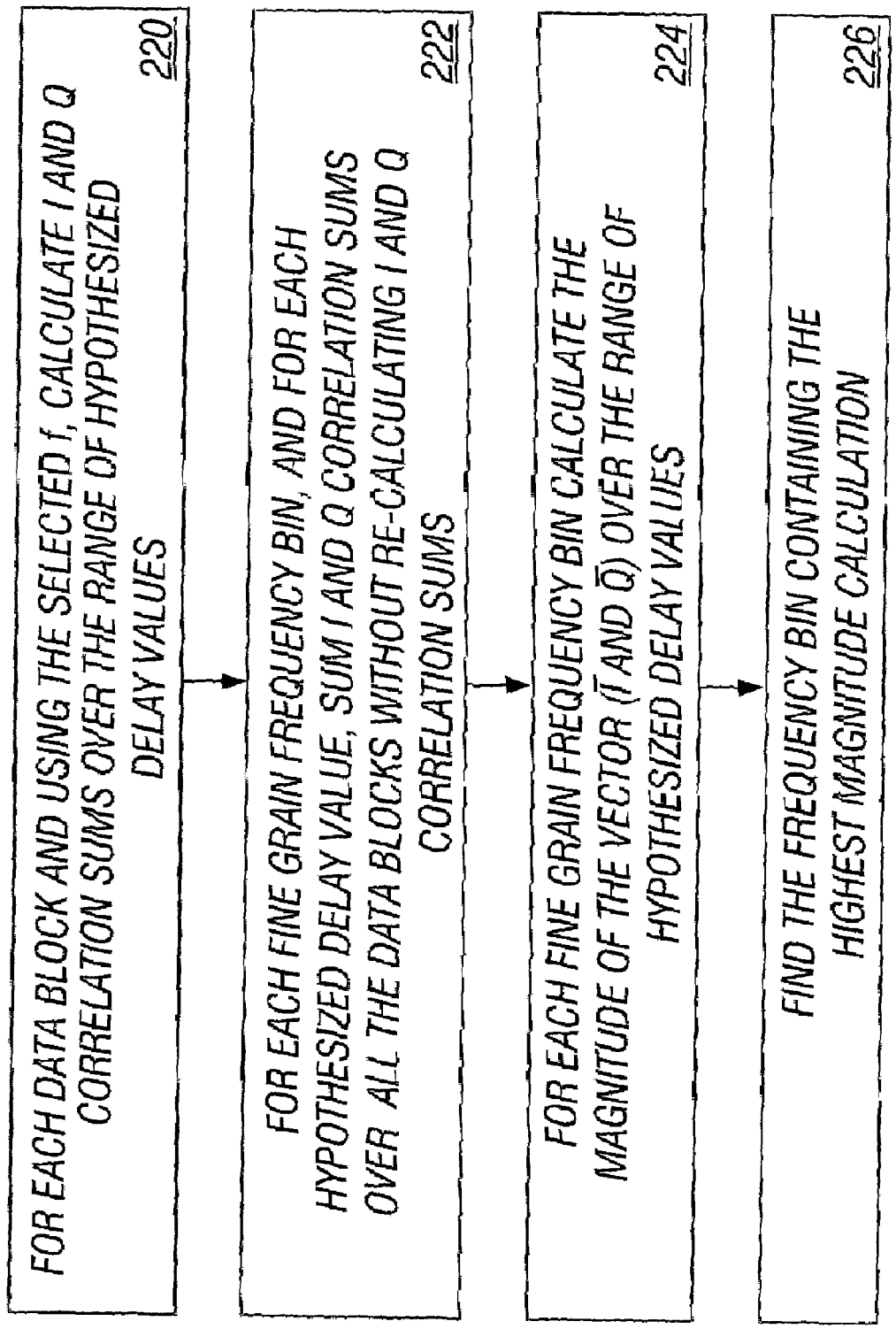

FIG. 2A and FIG. 2B are block diagrams that provide an alternative illustration of a technique for estimating the carrier frequency of a received signal. At block 202 of FIG. 2A, a frequency range of interest is determined. A frequency range of interest is the range of frequencies within which it is assumed that the true carrier frequency lies. In one embodiment of the invention, the frequency range of interest represents a pre-selected frequency interval around the carrier frequency of the known analog signal produced by signal source S.

At block 204, the frequency range is divided into multiple sets of frequency intervals, generally known as frequency bins. In one embodiment, two sets of frequency bins are used. The first set of frequency bins comprises a set of coarse grain frequency bins while the second set of frequency bins comprises a set of fine grain frequency bins. According to certain embodiments of the invention, the number of coarse grain frequency bins is preset to a constant which is independent of the length of the sampled data. In other embodiments, the number of coarse grain frequency bins is chosen to be proportional to the square root of the length of the sampled data. In addition, in certain embodiments, the selection of the number of coarse grain frequency bins may be based upon a user-selected signal-to-noise ratio tolerance.

At block 206, the sampled data is divided into a set of data blocks. In one embodiment, the set of data blocks corresponds to the set of coarse grain frequency bins, in the sense that the length of the data blocks is chosen by taking into account the size of the coarse grain frequency bins. At block 208, a range of hypothesized signal parameters such as delay values are determined by estimating the range of possible delay in time that is measured from the time the signal is transmitted from the signal source S until the time that the signal is received at receiver H. At block 210, for each coarse grain frequency bin, a trial value of frequency is selected. In some embodiments the trial value is the midpoint of a frequency bin. The trial value of frequency is herein referred to as a "trial f". At block 212, control is passed to block 220 of FIG. 2B.

At block 220 of FIG. 2B, for each data block, using the selected trial f, the In Phase and Quadrature correlation sums ("I and Q correlation sums") are calculated over the range of hypothesized delay values. At block 222, for each fine grain frequency bin and for each hypothesized delay value, the I and Q correlation sums are suitably weighted and then summed over all the data blocks, without re-calculating the I and Q correlation sums.

At block 224, if $\bar{I}$ and $\bar{Q}$ represent the summation of the I and Q sums respectively, then for each fine gain frequency bin and for each hypothesized delay value, the magnitude of the vector $(\bar{I}, \bar{Q})$ is calculated. At block 226, the fine grain frequency bin that contains the highest magnitude value is determined. The frequency value corresponding to the frequency bin that has the highest magnitude value is estimated to be the carrier frequency of the received signal, which includes the Doppler shift, if any.

Selection of an Instantiation of the Method

Figure 2C:
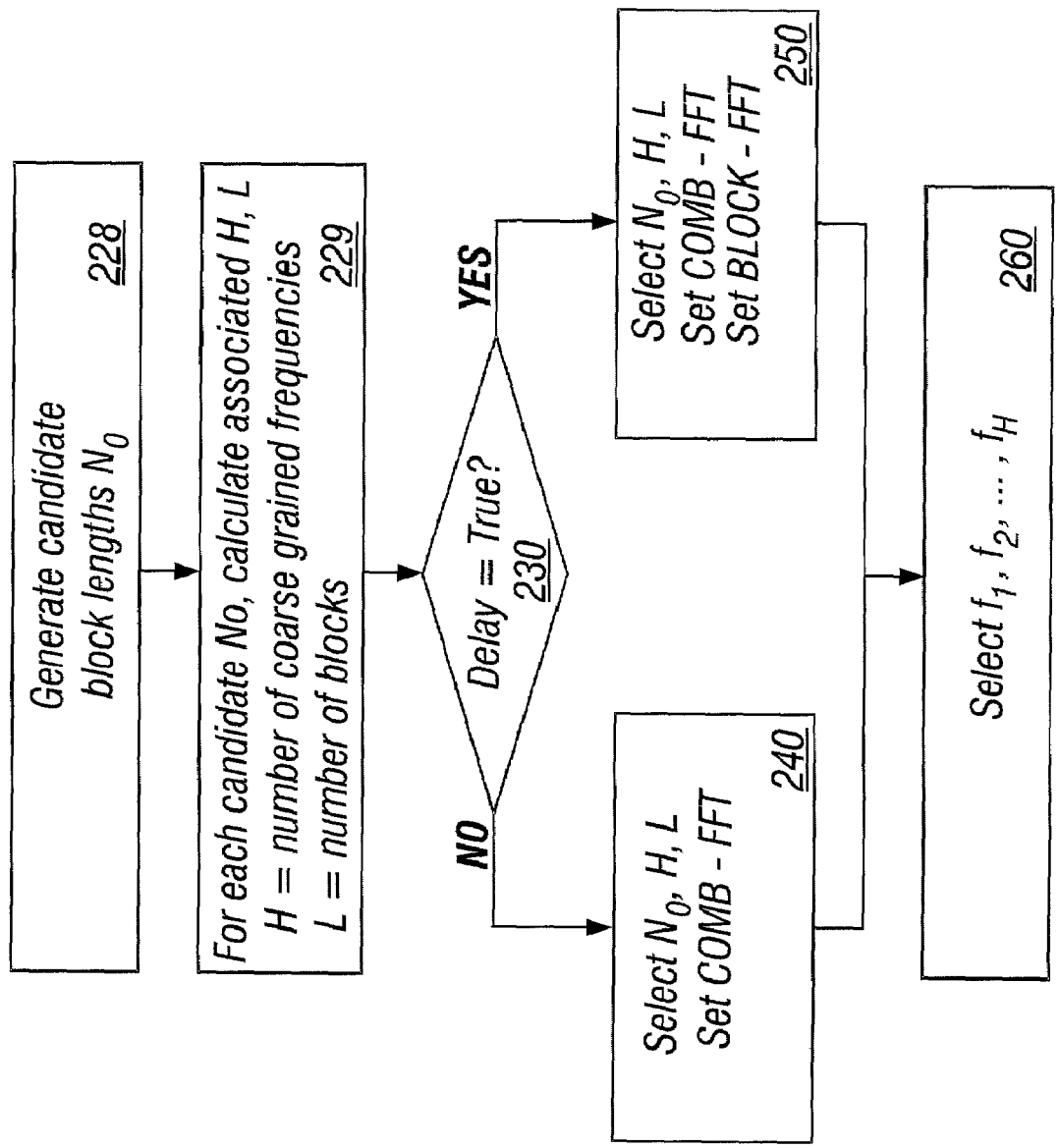
FIG. 2C is a flowchart that illustrates the details of the process for choosing a particular instantiation of the method and its associated parameters.

FIG. 2C is a flowchart that illustrates the details of the process at 200 of FIG. 1B for choosing a particular instantiation of the method and its associated parameters. The process begins at block 228 of FIG. 2C by generating a set of candidate block lengths $N_0$. In one embodiment, the set of candidate block lengths consists of all positive integers that are powers of 2 and that are smaller than N. In alternative embodiments the set of candidate $N_0$ could be any set consisting of integers in the range $\{2, \ldots, N-1\}$.

At block 229 for each candidate block length $N_0$, calculate $$H = \lceil n(F_2 - F_1)N_0 \Delta \rceil,$$

which will be the number of frequencies that will be considered for individual blocks and $$L = \left\lceil \frac{N}{N_0} \right\rceil,$$

which will be the corresponding number of blocks.

The next steps will rely on the following estimates of the computational complexity for different instantiations of the processes at block 400 and block 800 of FIG. 1B. These estimates are justified later, when the processes at block 400 and at block 800 are described in more detail herein in FIG. 4 and FIG. 6 respectively.

If block-level correlations are to be calculated by process at block 400 in a default manner, the computational effort of process at block 400 of FIG. 1B is estimated as

MHN.

If block-level correlations are to be calculated by process at block 400 of FIG. 1B using an FFT-based method, the computational effort of process at block 400 is estimated as $$3c \frac{N}{N_0} H(N_0 + M) \log(N_0 + M)$$

This option is available only if $s_k(\sigma)$ is of the form $s_{k-\sigma}$, that is, if the input DELAY is TRUE.

If the combining of the block-level correlations is to be carried out by process at block 800 of FIG. 1B in a default manner, the computational effort of process at block 800 is estimated as $$\frac{MHN^2}{N_0^2}$$

If the combining of the block-level correlations is to be carried out by process at block 800 using an FFT-based method, the computational effort of process at block 800 is estimated as $$cnHM \frac{N}{N_0} \log\left(\frac{nN}{N_0}\right).$$

At block 230 of FIG. 2C, it is determined whether DELAY is FALSE or TRUE.

If DELAY=FALSE, the process at block 240 of FIG. 2C is used, which does the following. For each candidate value of $N_0$ and associated value of H, it evaluates $$MHN + \min\left\{\frac{MHN^2}{N_0^2}, cnHM\frac{N}{N_0}\log\left(\frac{nN}{N_0}\right)\right\},$$

and selects that candidate value of $N_0$ for which the above expression is smallest. The above expression consists of the estimated complexity of calculating the block-level correlations in the default manner plus the estimated complexity of the better of the two alternative available methods of combining the block-level correlations. Furthermore, if the selected value of $N_0$, and the associated value of H, satisfy $$\frac{MHN^2}{N_0^2} < cnHM\frac{N}{N_0}\log\left(\frac{nN}{N_0}\right),$$

then the binary variable COMB-FFT is set to FALSE. Otherwise, COMB-FFT is set to TRUE.

If DELAY=TRUE, the process at block 250 is used, which does the following. For each candidate value of $N_0$ and associated value of H, it evaluates $$\min\left\{MHN, 3c\frac{N}{N_0}H(N_0+M)\log(N_0+M) + \min\left\{\frac{MHN^2}{N_0^2}, cnHM\frac{N}{N_0}\log\left(\frac{nN}{N_0}\right)\right\}\right\}$$

and selects that candidate value of $N_0$ for which the above expression is smallest. The above expression consists of the estimated complexity of calculating the block-level correlations using the better of the two alternative available methods plus the estimated complexity of combining the block-level correlations using the better of the two alternative available methods. Furthermore, if the selected value of $N_0$, and the associated value of H, satisfy $$MHN < 3c\frac{N}{N_0}H(N_0+M)\log(N_0+M),$$

then the binary variable BLOCK-FFT is set to FALSE. Otherwise, BLOCK-FFT is set to TRUE. Finally, if the selected value of $N_0$, and the associated value of H, $$\text{satisfy } \frac{MHN^2}{N_0^2} < cnHM\frac{N}{N_0}\log\left(\frac{nN}{N_0}\right)$$

then the binary variable COMB-FFT is set to FALSE. Otherwise, COMB-FFT is set to TRUE.

At the conclusion of process at block 240 or at block 250, a particular value for $N_0$ and an associated value of H and L have been selected. Then, the process at block 260 chooses the coarse-grained grid of frequencies $f_1, \ldots, f_H$ by letting $$f_h = F_1 + \frac{1}{2N_0\Delta n} + (h-1)\frac{1}{N_0\Delta n} \quad h=1,\ldots,H.$$

Because of the way that H and $f_H$ are chosen, the highest frequency on the grid is at least $F_2-1/(2N_0\Delta n)$. This is because $$H \geq n(F_2-F_1)N_0\Delta$$

and $$f_H = F_1 + \frac{1}{2N_0\Delta n} + (H-1)\frac{1}{N_0\Delta n} \geq F_1 + \frac{1}{2N_0\Delta n} + F_2 - F_1 - \frac{1}{N_0\Delta n}.$$

Since the distance between consecutive grid points is $1/(N_0\Delta n)$, it follows that for every $f \in [F_1, F_2]$ there is some $f_h$ which is within $1/(2N_0\Delta n)$ from f.

Figure 3:
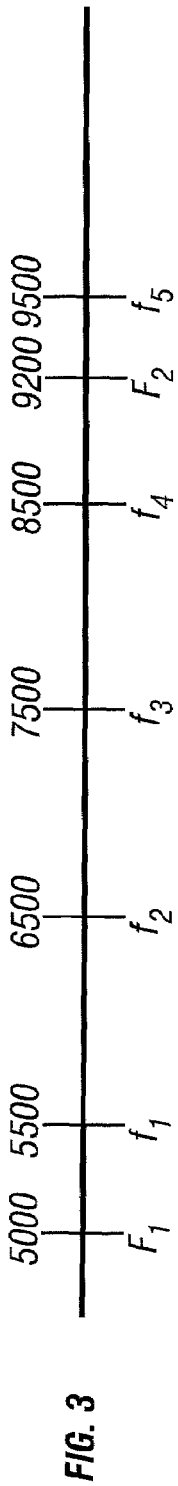
FIG. 3 illustrates a structure of a coarse-grained grid.

The structure of this grid is illustrated in FIG. 3. In that figure, and for the purpose of illustration, it is assumed that $F_1$=5000, $F_2$=9200, and $N_0\Delta n$=1/1000. This leads to H=5 and $f_1$=5500, $f_2$=6500, $f_3$=7500, $f_4$=8500, $f_5$=9500.

Calculation of Block-Level Correlations

Figure 4:
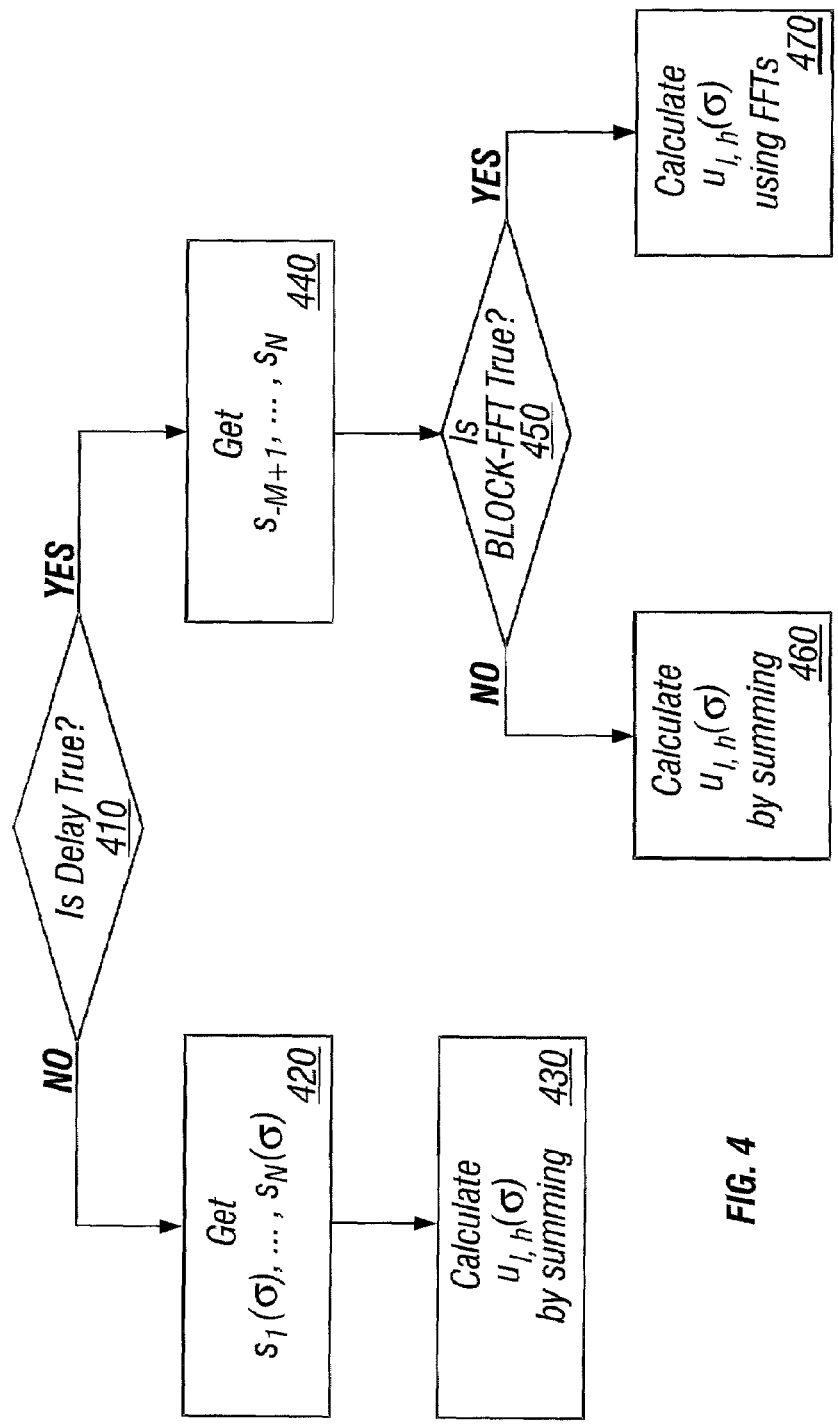
FIG. 4 is a flowchart depicting the details of the process for calculating the block-level correlations.

FIG. 4 is a flowchart depicting the details of process at block 400 of FIG. 1B for calculating the block-level correlations. For each block $l \in \{1,\ldots L\}$, for each coarse-grained frequency $f_h$, $h \in \{1,\ldots,H\}$, and for each $\sigma \in \mathcal{M}=\{1,\ldots,M\}$, this process calculates the block-level correlation sums $$u_{l,h}(\sigma) = \sum_{k=(l-1)N_0+1}^{lN_0} y_k s_k(\sigma) e^{2\pi i f_h(k-(l-1)N_0)\Delta}.$$

The process first examines at block 410 of FIG. 4 the algorithm parameter DELAY. If the algorithm parameter DELAY is FALSE, the process receives at block 420 $s_1(\sigma), \ldots, s_N(\sigma)$ from the reference signal generator, and calculates at block 430 the desired $u_{l,h}(\sigma)$ by straightforward multiplications and summations. The total computational effort of this step is estimated as

MHN.

If the algorithm parameter DELAY is TRUE, the process receives at block 440 $s_{-M+1}, \ldots, s_N$ from the reference signal generator and calculates for each block $l \in \{1,\ldots,L\}$, for each frequency $f_h$, $h \in \{1,\ldots,H\}$, and for each $\sigma \in \mathcal{M}=\{1,\ldots M\}$, $$u_{l,h}(\sigma) = \sum_{k=(l-1)N_0+1}^{lN_0} y_k s_{k-\sigma} e^{2\pi i f_h(k-(l-1)N_0)\Delta},$$

after choosing at block 450 between one of two alternative methods. Thus, at block 450, it is determined whether BLOCK-FFT is TRUE or FALSE.

If BLOCK-FFT is FALSE, it proceeds using at block 460 straightforward multiplications and summations, and the total computational effort of this step is estimated as

MHN.

Alternatively, if BLOCK-FFT is TRUE, it uses a process at block 470 that relies on the fact that for any fixed l and h, the quantities $u_{l,h}(\sigma)$ correspond to a convolution of the sequence $S_{(l-1)N_0-lM+1}, \ldots, S_{lN_0}$, of length $N_0+M$, with the sequence $y_k e^{2\pi i f_k (k-(l-1)N_0)\Delta}$, for $k=(l-1)N_0+1, lN_0$, of length $N_0$. This convolution is calculated by padding both sequences with zeroes at the end, so that their length becomes the same and equal to $N_0+M$, taking the FFT of the two sequences, multiplying the FFTs, and then taking the inverse FFT.

The complexity of computing a single convolution is estimated as $3c(N_0+M) \log(N_0+M)$, where the factor of 3 is due to the fact that there is a total of 3 FFTs or inverse FFTs. There are LH convolutions to be computed (one for each (l, h) pair) and the total computational effort of this step is estimated as $$3c \frac{N}{N_0} H(N_0 + M) \log(N_0 + M).$$

Alternative embodiments of the calculation at block 400 of FIG. 1B for block-level correlations are possible, especially when the reference signal has a special structure. For example, when processing GPS signals, the reference signal is a periodic PRN (pseudorandom noise) code, modulated by a slow binary signal. This structure is exploited in U.S. patent application Ser. No. 09/888,228, entitled "SIGNAL ACQUISITION USING DATA BIT INFORMATION" by Anant Sahai, Wallace Mann, Andrew Chou and Benjamin Van Roy, filed on the same day herewith, now U.S. Pat. No. 6,512,479.

Alternative embodiments are also possible in the case where the received signal is not sampled, but is processed in analog form. In that case, the block-level correlations $u_{l,h}(\sigma)$ can be calculated using one or more analog correlators, implemented in hardware.

Generating the Reference Signal

Figure 5:
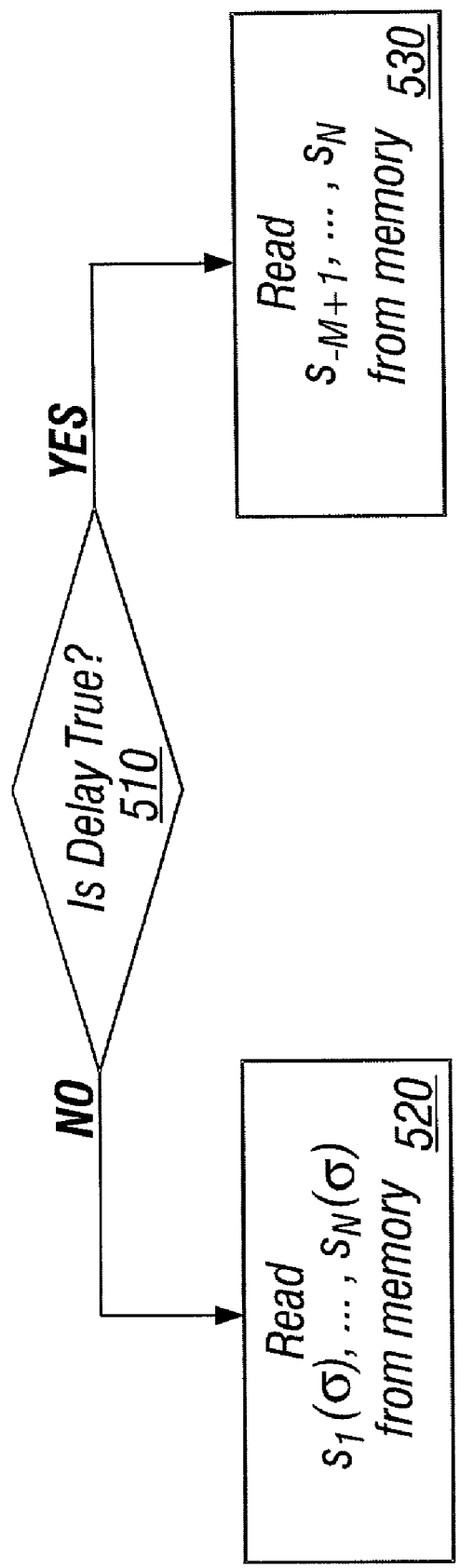
FIG. 5 is a flowchart depicting the details of the process for generating the reference signal.

FIG. 5 is a flowchart depicting the details of the process at block 600 of FIG. 1B for generating the reference signal. At block 510 of FIG. 5, it is determined whether the parameter DELAY is TRUE or FALSE. If algorithm parameter DELAY is FALSE, then at block 520 of FIG. 5 the reference signal generator stores in random access memory a sequence of values $s_1(\sigma), \ldots, s_N(\sigma)$, for every $\sigma \in \mathcal{M}$ and supplies these values as needed by process at block 400 of FIG. 1B. If algorithm parameter DELAY is TRUE, then at block 530 the reference signal generator stores in its memory a sequence of values $s_{-M+1}, \ldots, s_N$ and supplies these values as needed by process at block 400. In particular, for every k and $\sigma$, $s_k(\sigma)=s_{k-\sigma}$ is set. In alternative embodiments, the reference signal is not read from memory but is generated on the fly by a computational algorithm.

In alternative embodiments, the reference signal is calculated by combining information that is stored in local memory with other information that is externally provided. For instance, if the reference signal is a GPS signal, it can be formed by modulating a locally stored PRN code by a slowly varying binary signal consisting of "navigation bits."

These navigation bits are not a priori known, but can be obtained in real time from a commercial provider or from a differential GPS station via a communication network, such as the internet.

Combining the Block-Correlations

Figure 6:
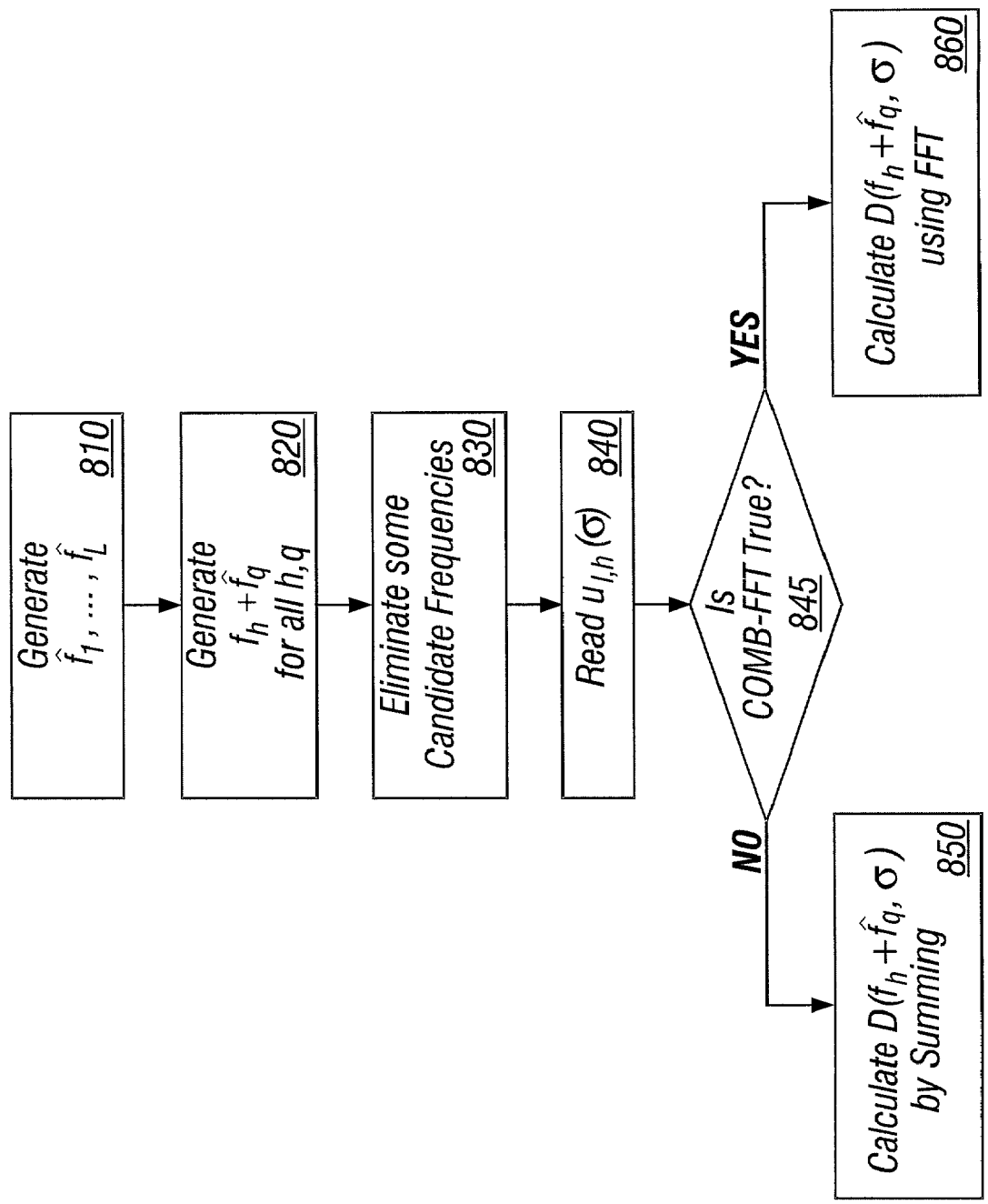
FIG. 6 is a flowchart depicting the details of the process for combining the block-level correlations to obtain the correlation function D(f, σ)

FIG. 6 is a flowchart depicting the details of the process at 800 of FIG. 1B for combining the block-level correlations to obtain the correlation function $D(f, \sigma)$, for every or $\sigma \in \mathcal{M}$ and for every f in a certain set $\mathcal{F}$ of fine-grained frequencies that is constructed in the beginning of process at block 800.

At block 810 of FIG. 6 a set of frequencies $\hat{f}_1, \ldots, \hat{f}_L$, is constructed using the formula $$\hat{f}_q = -\frac{-1}{2nN_0\Delta} + \frac{1}{2LnN_0\Delta} + \frac{q-1}{L}\frac{1}{nN_0\Delta}, \quad q=1, \ldots, L.$$

Note that these frequencies are spaced $1/(nLN_0\Delta)$ apart, which is a factor of L smaller than the spacing $1/(nN_0\Delta)$ of the coarse-grained frequencies $f_1, \ldots, f_H$. Subsequently, at block 820 the process forms the set of all frequencies of the form $f_h + \hat{f}_q$, where h ranges over the set $\{1, \ldots, H\}$ and q ranges over the set $\{1, \ldots, L\}$. Then, at block 830, the above set is pruned by eliminating those frequencies $f_h + \hat{f}_q$ that are larger than $F_2 + (1/nN_0\Delta L)$. Let $\mathcal{F}$ be the resulting set, which is the set of fine-grained frequencies to be considered. Its cardinality is denoted by B and satisfies $B \leq LH$.

The smallest frequency in that set is $$f_1 + \hat{f}_1 = F_1 + \frac{1}{2N_0\Delta n} - \frac{1}{2N_0\Delta n} + \frac{1}{2LN_0\Delta n} = F_1 + \frac{1}{2LN_0\Delta n}.$$

The largest frequency of the form $f_h + \hat{f}_q$ is $$f_H + \hat{f}_L = F_1 + \frac{1}{2N_0\Delta n} + (H-1)\frac{1}{N_0\Delta n} - \frac{1}{2nN_0\Delta} +$$
$$\frac{1}{2LN_0\Delta n} + \frac{L-1}{L}\frac{1}{nN_0\Delta}$$
$$\geq F_2 - \frac{1}{2nN_0\Delta L}.$$

Because of the choice of the spacing, which is $1/(nN_0\Delta L)$, it follows that for every $f^* \in [F_1, F_2]$, there exists some $f_h + \hat{f}_q \in \mathcal{F}$ which is within $1/(2nN_0\Delta L)$ of $f^*$.

Figure 7:
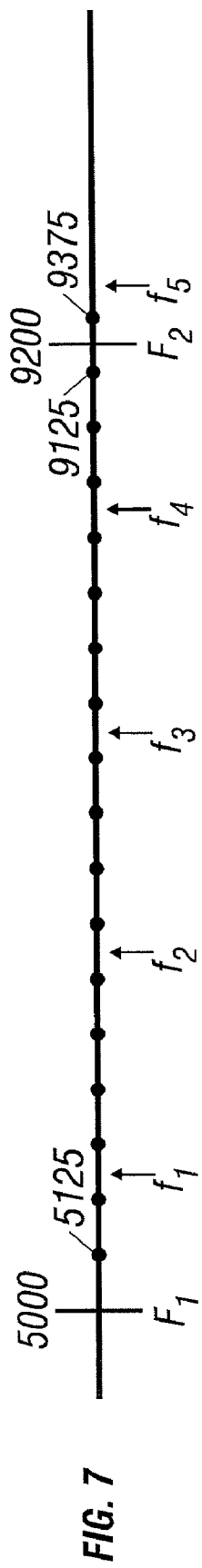
FIG. 7 illustrates the frequencies of the form $f_h + f_q$ comprising the set $\mathcal{F}$.
Figure 8:
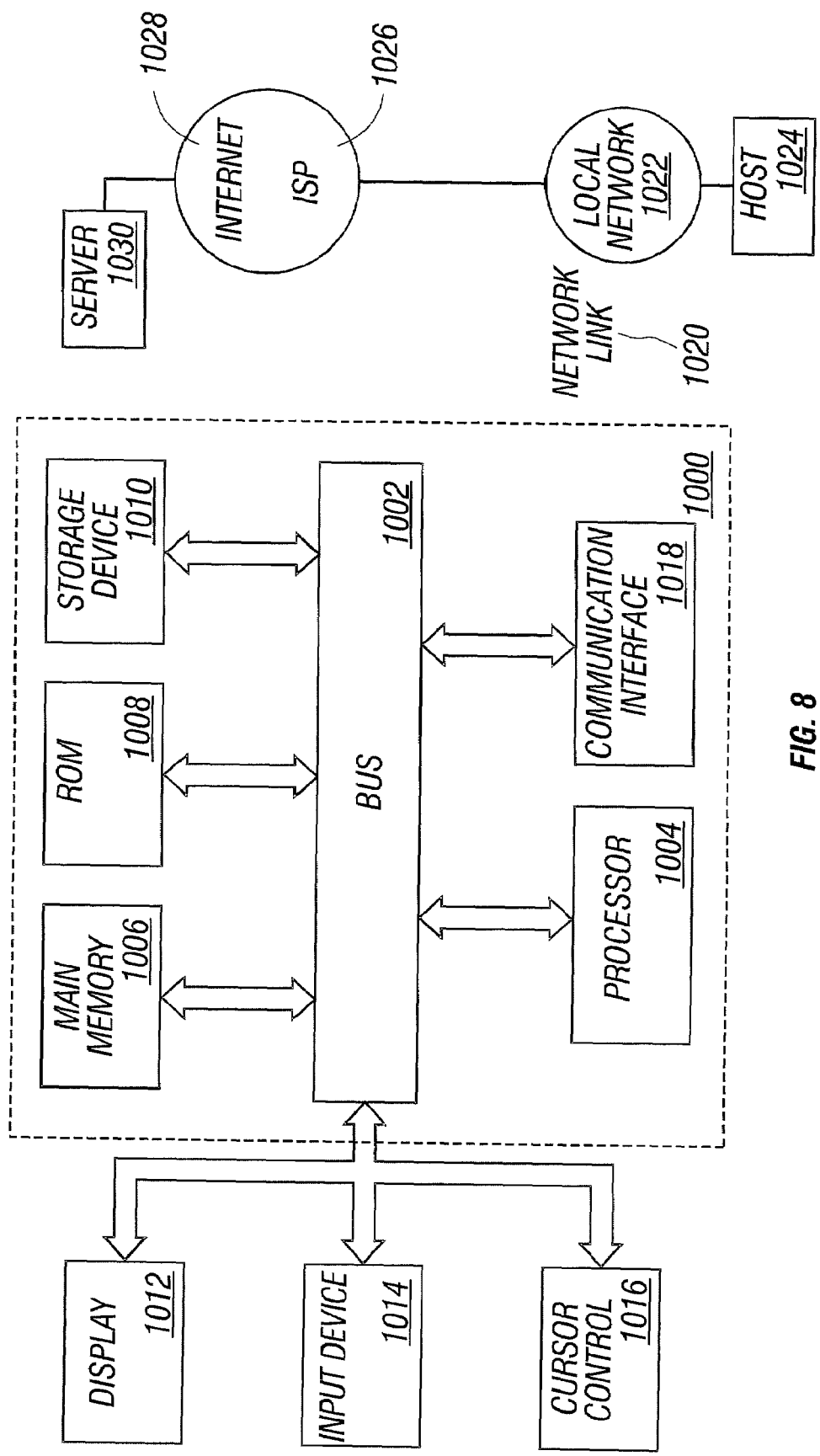
FIG. 8 is a block diagram illustrating a computer system on which embodiments of the invention may be implemented.

The frequencies of the form $f_h + \hat{f}_q$ comprising the set $\mathcal{F}$ are illustrated in FIG. 7. In FIG. 7, and for the purpose of illustration, it is assumed that $F_1=5000$, $F_2=9200$, $N_0\Delta n=1/1000$, and L=4. In particular, H=5 and the spacing between consecutive fine-grained frequencies is $1/(nLN_0\Delta)=250$. The fine-grained frequencies are indicated by the heavy dots on the frequency axis. For reference, the coarse-grained frequencies $f_h$ are also indicated. The lowest fine-grained frequency is $F_1+1/(nLN_0\Delta)=5125$ and the highest is 9375. The cardinality B of $\mathcal{F}$ is 18, which is somewhat smaller than LH=20.

The rest of this process at block 800 calculates $$D(f_h + \hat{f}_q, \sigma) = \sum_{l=1}^{L} u_{l,h}(\sigma) e^{2\pi j (l-1)(f_h + \hat{f}_q) N_0 \Delta + j\theta_{(l-1)N_0}},$$

for every $f_h + \hat{f}_q \in \mathcal{F}$. The calculation uses as input 840 the numbers $u_{l,h}(\sigma)$ (one such number for each $l \in \{1, \ldots, L\}$, each $h \in \{1, \ldots, H\}$, and each $\sigma \in \mathcal{M}$) which are the output of the process at block 400 of FIG. 1B. At Block 845, it is determined whether the binary algorithm parameter COMB-FFT has been set by process at block 200 of FIG. 1B to TRUE or FALSE.

If COMB-FFT is FALSE, the process at block 850 that is used to calculate $D(f_h + \hat{f}_q, \sigma)$ just implements the above displayed formula. This is done for M values of $\sigma$, and B values of $f_h + \hat{f}_q$. For each $(f_h + \hat{f}_q, \sigma)$ pair, there are $L \approx N/N_0$ complex additions and multiplications to be performed. Thus, the complexity of the process at block 850 can be estimated as $$MB \frac{N}{N_0}.$$

Typically, one has $B/N \approx H/N_0$, or $B \approx NH/N_0$, and the above complexity estimate becomes $$\frac{MHN^2}{N_0^2}$$

If COMB-FFT is TRUE, an alternative process at block 860 is used. It is observed that $$D(f_h = \hat{f}_q, \sigma)$$

can be rewritten as $$D(f_h + \hat{f}_q, \sigma) = \sum_{l=1}^{L} u_{l,h}(\sigma) e^{2\pi j (l-1) f_h N_0 \Delta + j\theta_{(l-1)N_0}} e^{2\pi j (l-1) \hat{f}_q N_0 \Delta}$$

Viewed as a function of $\hat{f}_q N_0 \Delta$, this is the discrete Fourier transform of the sequence $u_{l,h}(\sigma) e^{2\pi j (l-1) f_h N_0 \Delta + j\theta_{(l-1)N_0}}$, $l=1, \ldots, L$. Thus, one can take the FFT of this sequence and obtain $D(f_h + \hat{f}_q, \sigma)$ for all $\hat{f}_q$ such that $\hat{f}_q N_0 \Delta$ is an integer multiple of the fundamental frequency which is $1/L$. That is the same as computing $D(f_h + \hat{f}_q, \sigma)$ for all $\hat{f}_q$ that are integer multiples of $1/(L N_0 \Delta)$. However, the frequencies $\hat{f}_q$ of interest are spaced $1/(n L N_0 \Delta)$ apart, and therefore, the frequency resolution has to be refined by a factor of n.

The above is accomplished by the process at block 860 which does the following. Take the original sequence $u_{l,h}(\sigma) e^{2\pi j (l-1) f_h N_0 \Delta + \theta_{(l-1)N_0}}$, $l=1, \ldots, L$, of length L, append $(n-1)L$ zeroes at the end, to obtain a sequence of length nL, and then compute the FFT of the longer sequence. For each $\sigma \in \mathcal{M}$ and for each $f_h$, the transform at the required resolution is computed with $cnL \log(nL) L$ operations. Since $L \approx N/N_0$, the complexity of this process is estimated as $$cnHM \frac{N}{N_0} \log\left(\frac{nN}{N_0}\right).$$

Approximation Guarantees

In this subsection, it is explained why the method described in the above has the desired approximation guarantees. For simplicity, let us consider the case where the additional phase term $\theta_k$ is absent. The quantity approximated by the method is given by $$C(f, \sigma) = \sum_{k=1}^{N} y_k s_k(\sigma) e^{2\pi j f k \Delta}.$$

The approximation constructed is of the form $$D(f, \sigma) = \sum_{k=1}^{N} y_k s_k(\sigma) e^{2\pi j \phi_f(k) \Delta}.$$

For k in the lth block, one has $$\phi_f(k) = f_h(k - (l-1)N_0) + (l-1)(f_h + f_q)N_0 = (f_h + f_q) k - f_q(k - (l-1))N_0.$$

Indeed, the first term $f_h(k - (l-1)N_0)$ is introduced when computing the block-level correlations $$u_{l,h}(\sigma) = \sum_{k=(l-1)N_0+1}^{l N_0} y_k s_k(\sigma) e^{2\pi j f_h (k - (l-1)N_0) \Delta}.$$

The second term $(l-1)(f_h + \hat{f}_q)N_0$ is introduced by the combining formula $$D(f_h + \hat{f}_q, \sigma) = \sum_{l=1}^{L} u_{l,h}(\sigma) e^{2\pi j (l-1)(f_h + \hat{f}_q) N_0 \Delta + j\theta_{(l-1)N_0}},$$

For every possible frequency f* in the range $[F_1, F_2]$, and because the frequencies $f_h + \hat{f}_q$ are spaced $1/(n N_0 L \Delta)$ apart, there is some $f = f_h + \hat{f}_q$ such that $$|f - f^*| \leq \frac{1}{2 n N_0 L \Delta}.$$

Further, it follows that $$|f^* k - \phi_f(k)| \leq |f^* - f_h - \hat{f}_q| k + |\hat{f}_q| (k - (l-1)N_0)$$

-continued $$\leq \frac{1}{2nN_0L\Delta}N_0L + \frac{1}{2nN_0\Delta}N_0$$

$$= \frac{1}{n\Delta}.$$

It follows that for every possible frequency f*, there is a fine-grained frequency $f=f_h+f_q$, for which $D(f, \sigma)$ is calculated, and for which $$\left| 2\pi\phi_f(k)\Delta - 2\pi f^*k\Delta \right| \leq \frac{2\pi}{n}, \text{ for all } k.$$

When the time-varying phase $\theta_k$ is present, there is an additional phase error equal to the maximum change of $\theta_k$ in the course of a block. When $\theta_k$ changes slowly, and provided that the block length is not too large, the error due to this additional phase term is negligible.

ALTERNATIVE EMBODIMENTS

The embodiments as described herein are easily modified to deal with certain changes in the objective of the computation or to accommodate certain preferences and other considerations. A number of alternative embodiments of the various steps are discussed in the sequel.

Selection of Coarse and Fine-Grained Frequency Grids

There are many ways of selecting the grid of coarse frequencies $f_h$ and the grid $\mathcal{F}$ of fine-grained frequencies. In some embodiments, the density of the grid $\mathcal{F}$ need not be L times more than the density of the initial grid $f_1, \ldots, f_H$. In some embodiments, one or both of these grids can be chosen to have non-uniform spacing between consecutive grid points. In some embodiments, the frequency grid points are selected ahead of time by the user, whereas in other embodiments the frequency grids are selected by the algorithm taking into account various input parameters. Finally, in some embodiments, one may choose the offsets between the coarse and the fine grids so that the coarse grid is a subset of the fine grid.

Choosing the Frequency Grid Spacings

In one embodiment, the spacing of the coarse and of the fine-grained frequency grids is indirectly specified by the input parameter n that reflects a tolerance for phase approximation errors. In alternative embodiments, the various grid spacings are directly specified by the user. In other embodiments, one uses a formula that quantifies performance losses as a function of the spacing of the various grids and selects the grid spacing by evaluating the tradeoff between performance losses and computational complexity.

Partitioning the Frequency Range $[F_1, F_2]$.

In some embodiments, one can start by partitioning the frequency range $[F_1, F_2]$ into disjoint or overlapping frequency subintervals, and apply the method separately for each one of these subintervals. In some instances, the subintervals can be chosen small enough so that H=1 and a single coarse-grained frequency will suffice for each subinterval. That single frequency can be chosen to be the center of the subinterval, or can be chosen differently.

Selection of Algorithm Parameters

The selection of a particular method during process at block 200 of FIG. 1B, can be made using alternative complexity criteria. For example, if certain FFTs (of the reference signal or of the data sequence) are available at no extra computation cost, (e.g., if they are calculated by some other part of a broader algorithm), then the corresponding computational cost should not be included in the cost of process at block 400. Furthermore, if different embodiments of the processes at block 400 and at block 800 of FIG. 1B are employed, then their computational costs have to be estimated and used in selecting the most efficient method.

The particular complexity criteria used in the embodiment of process at block 200 of FIG. 1B can be replaced by other estimates of the run times of the various blocks, depending on the desired degree of precision. For example, the cardinality of the set $\mathcal{F}$ was estimated as LH. An alternative embodiment estimates the cardinality of $\mathcal{F}$ as $$\lceil n(F_2-F_1)N\Delta \rceil,$$

which can be more accurate when $F_2-F_1$ is small.

One embodiment chooses between FFT-based and default methods, and sets the binary variables BLOCK-FFT and COMB-FFT based on computational complexity estimates. In alternative embodiments, these choices are preset by the user.

In alternative embodiments, the method is applied in contexts where the binary input variable DELAY is always TRUE, or always FALSE. In such cases, this variable need not be treated as an input of the algorithm, and the method can be accordingly simplified by omitting those alternatives that do not apply.

One embodiment provides a specific method for choosing the block size $N_0$. In alternative embodiments the block size can be preset by the user. Or the block size can be selected according to another set of criteria. In some cases, there may be a restriction on the minimum allowed block size. In some cases, there may be a restriction on the maximum allowed block size. In some cases, the block length may be restricted to be approximately equal to the square root of N.

Missing Data

Certain embodiments are easily modified to deal with the case in which some of the data samples $y_k$ are missing. In one embodiment, the calculations are performed only over those blocks where there are no missing data. In an alternative embodiment, missing data are set to zero, and the calculations are performed only over those blocks in which there are nonzero data. The complexity calculations in process at block 200 of FIG. 1B can be suitably modified to take this variation into account.

A Top-Down Approach

Certain embodiments use a bottom-up approach in which all block-level correlations are computed first by the process at block 400 of FIG. 1B, and are then used to calculate the approximate correlation sums $D(f, \sigma)$ for all candidate f and $\sigma$. In an alternative embodiment, one may start by considering a limited set of candidate f and $\sigma$, and calculate $D(f, \sigma)$ only for the chosen candidates. This limited set may consist of just one or multiple candidates. The calculation of $D(f, \sigma)$ for some candidate $(f, \sigma)$ requires certain quantities $u_{l,h}(\sigma)$ to be made available. These quantities can be calculated as needed. Furthermore, once a quantity $u_{l,h}(\sigma)$ is calculated, it is stored in memory, so that if it is ever needed in the future it need not be recomputed. This variation is useful in a situation where certain pairs $(f, \sigma)$ are examined first. If the ambiguity value associated with some pair (f, σ) turns out to be above some threshold, the process can stop. Otherwise, it can continue to examine a larger set of pairs.

A Sequential Approach

Certain embodiments commit to processing the full set of data. In an alternative embodiment, a smaller set of data is examined first. This can be accomplished, for example, by keeping the same block length $N_0$ but using a smaller number L' of blocks, so that only $L'N_0<N$ of the data are utilized. If the ambiguity value associated with some pair (f, σ) is found to exceed a certain threshold, the algorithm is deemed to have successfully acquired the signal and the computation can stop. Otherwise, a larger number of blocks is fed to the algorithm, and the algorithm repeats on the expanded set of blocks and data. Any intermediate results that have been calculated when using a smaller number of blocks are saved in memory so that they can be reused later. When dealing with a smaller set of data, the grid-spacing of the frequencies to be searched can be taken to be coarser, with an attendant reduction of the computational effort. If the number of blocks is subsequently increased, the frequency grid is refined. With such an approach, the computational complexity of the overall method will be different, and suitable changes have to be made in the process used to select the various algorithm parameters.

A Hierarchical Version

In certain embodiments, there are only two frequency grids and the data are broken into a single set of blocks. In alternative embodiments, the same method is used in a hierarchical manner. In one embodiment, the blocks are broken down into subblocks and the calculation of the various block-level correlations is approximated by calculating correlation sums for each subblock and then merging them together to synthesize block-level correlations. This decomposition can be continued recursively by introducing an arbitrary number of levels.

In the more general embodiment, a hierarchy of levels is used. With each level r there is an associated decomposition of the data into blocks, and an associated grid $\mathcal{F}_r$ of frequencies. For each level r, the grid of frequencies $\mathcal{F}_r$ need not be regularly spaced. The only constraint is on the block sizes at the different levels. A block at a higher level r must be the union of smaller blocks at lower levels r'<r. One then proceeds as follows. Starting from the lowest level, call it level 1, calculate correlation sums $D_i(f, \sigma)$ for the various blocks i and for the various frequencies f in the set of frequencies $\mathcal{F}_1$ associated with that level. For a higher level r>1, and for all the blocks and all the frequencies in the set $\mathcal{F}_r$ associated with that level, calculate approximate correlation sums, as a linear combination of the correlation sums calculated from a lower level. In particular, the calculation of a correlation sum $D_i(f, \sigma)$ at a certain frequency f∈$\mathcal{F}_r$ and for a certain r-level block i, makes use of the correlation sums $D_3(f', \sigma)$ for those (r−1)-level blocks j that comprise block i, and for those frequencies f'∈$\mathcal{F}_{r-1}$, that are closest to f.

Exploring a Small Frequency Range

In some situations, one may want to evaluate approximate correlation sums D(f, σ) for a small range of frequencies, or even at a single frequency. This is accomplished by forming a suitable linear combination of block-level correlations that are already available at frequencies in the vicinity of the frequency f of interest. An embodiment of this kind is of interest in various contexts. One particular context is when the signal has already been acquired, a moderately accurate estimate f̂ of the true carrier frequency is available, and a search for a more accurate estimate by exploring the vicinity of f̂ is desired.

Hardware Overview

An embodiment of the invention may be implemented using a computer system that includes a processor for processing information. The Computer system also includes a main memory, such as a random access memory (RAM) or other dynamic storage device, coupled to a bus for storing information and instructions to be executed by the processor. The main memory also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to the bus for storing information and instructions.

The invention is related to the use of the computer system for implementing the techniques described herein. According to one embodiment of the invention, those techniques are implemented by the computer system in response to the processor executing one or more sequences of one or more instructions contained in main memory. Such instructions may be read into the main memory from another computer-readable medium, such as the storage device. Execution of the sequences of instructions contained in the main memory causes the processor to perform the process steps described herein. One or more processors in a multi-processing arrangement may also be employed to execute the sequences of instructions contained in the main memory. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including but not limited to, non-volatile media, volatile media, and transmission media. Non-volatile media includes, for example, optical or magnetic disks, such as the storage device. Volatile media includes dynamic memory, such as the main memory. Transmission media includes coaxial cables, copper wire and fiber optics, including the wires that comprise the bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor for execution. For example, the instructions may initially be carried on a magnetic disk of a remote computer. The remote SO computer can load the instructions into its dynamic memory and send the instructions over a telephone line using a modem. A modem local to computer system can receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection through the local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), the network link and the communication interface. In the Internet example, a server might transmit a requested code for an application program through the Internet, the ISP, the local network and the communication interface. In accordance with the invention, one such downloaded application implements the techniques described herein.

The received code may be executed by the processor as it is received, and/or stored in the storage device, or other non-volatile storage for later execution. In this manner, the computer system may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for estimating a carrier frequency, the method comprising the steps of:

Step A: defining R levels, indexed by consecutive integers 1 to R, wherein each level r is associated with a set of data blocks that together make up a set of data that is associated with a received signal;

each data block in the set of data blocks associated with a level r, where r is greater than 1, is made up from data blocks from the set of data blocks associated with level r−1;

the set of data blocks associated with the level R comprises a single data block;

each level r is associated with a set of frequencies; and the set of frequencies associated with the level R comprises a set of candidate frequencies;

Step B: for each data block in the set of data blocks associated with the first level, calculating at each frequency in the set of frequencies associated with the first level, a pair of I and Q integrals to produce corresponding pairs of I and Q correlation values;

Step C: selecting level 2 to be a current level and selecting level 1 to be a previous level;

Step D0: selecting a data block in the set of data blocks associated with the current level that has not been previously selected to be a selected data block;

Step D1: selecting a set of constituent data blocks from the set of data blocks associated with the previous level that make up the selected data block to be a selected set of constituent data blocks;

Step D2: selecting a frequency from the set of frequencies associated with the current level to be a selected frequency;

Step D3: selecting the pairs of I and Q correlation values corresponding to each data block in the selected set of constituent data blocks and corresponding to a frequency associated with the previous level which is close to the selected frequency, to be the selected pairs of I and Q correlation values;

Step D4: selecting weights for the selected pairs of I and Q correlation values, based on a difference between the target frequency and the frequency at which the selected pairs of I and Q correlation values are calculated, and also based on the position of the data block that corresponds to the selected pair of I and Q correlation values;

Step D5: weighting the selected pairs of I and Q correlation values according to the selected weights to produce a set of weighted pairs of I and Q correlation values corresponding to the selected data block and the selected frequency;

Step D6: summing the weighted pairs of I and Q correlation values to produce a pair of I and Q correlation values associated with the current level, selected data block, and the selected frequency;

Step D7: repeating steps D2–D6 until every frequency from the set of frequencies associated with the current level has been selected to be the selected frequency; and Step D8: repeating steps D0–D7 until every data block in the set of data blocks associated with the current level has been selected to be the selected data block;

Step E: If the current level r is not level R, updating the current level to be level r+1, updating the previous level to be level r, and repeating steps D0–E; and Step F: Estimating the carrier frequency on the basis of the pairs of I and Q correlation values associated with level R and with the frequencies in the set of candidate frequencies.

2. The method of claim 1 wherein Step F comprises the steps of:
Step F1: for each frequency in the set of candidate frequencies, calculating a magnitude associated with the corresponding pair of I and Q correlation values; and
Step F2: estimating a carrier frequency by selecting a frequency in the set of candidate frequencies for which the associated magnitude is largest.

3. The method of claim 2 wherein the received signal is a GPS signal.

4. The method of claim 2 wherein the maximum magnitude is compared against a threshold.

5. The method of claim 4 wherein the received signal is a GPS signal.

6. The method of claim 1 wherein the set of data that is associated with the received signal comprises sampled data obtained by sampling the received signal.

7. The method of claim 6 wherein the received signal is a GPS signal.

8. The method of claim 1 wherein the set of data that is associated with the received signal is an analog signal.

9. The method of claim 8 wherein the received signal is a GPS signal.

10. The method of claim 1 wherein the received signal is a GPS signal.

11. The method of claim 10 wherein the step of calculating the pair of I and Q correlation integrals is performed coherently based on navigation bit information associated with a global positioning satellite vehicle.

12. The method of claim 10 wherein the set of candidate frequencies is determined on the basis of an intermediate frequency employed by a receiver and a Doppler shift associated with a global positioning satellite vehicle.

13. The method of claim 1, wherein the steps B–E are repeated for each hypothesized delay value over a range of hypothesized delay values, to produce a pair of I and Q correlation values corresponding to each candidate frequency and each hypothesized delay value.

14. The method of claim 13 wherein the received signal is a GPS signal.

15. The method of claim 13, wherein the step of estimating the carrier frequency comprises the steps of:
for each candidate frequency within the set of candidate frequencies and for each hypothesized delay in the range of hypothesized delay values, calculating a magnitude associated with the corresponding pair of I and Q correlation values; and
selecting the hypothesized delay value and candidate frequency that has the highest magnitude calculation.

16. The method of claim 15 wherein the received signal is a GPS signal.

17. The method of claim 15 wherein the maximum magnitude is compared against a threshold.

18. The method of claim 1 wherein the received signal is a GPS signal.

19. The method of claim 1, wherein the number R of levels equals 2.

20. The method of claim 19 wherein the received signal is a GPS signal.

21. The method of claim 1, wherein the number of data blocks iii the set of data blocks associated with each level is proportional to a length of the received signal.

22. The method of claim 21 wherein the received signal is a GPS signal.

23. The method of claim 1, wherein every data in the set of data blocks associated with the same level has the same length.

24. The method of claim 23 wherein the received signal is a GPS signal.

25. The method of claim 23, wherein the number of frequencies in the set of frequencies associated with a level is proportional to the length of the data blocks associated with the level.

26. The method of claim 25 wherein the received signal is a GPS signal.

27. A method for estimating a carrier frequency, the method comprising the steps of:
receiving data associated with a received signal;
determining a frequency range of interest;
determining a set of coarse frequencies within the frequency range of interest;
determining a set of fine frequencies within the frequency range of interest;
dividing the data into a set of data blocks;
for each data block of the set of data blocks, calculating I and Q correlation values associated with the data at each frequency from the set of coarse frequencies;
for every frequency of the set of fine frequencies, determining a selected frequency in the set of coarse frequencies, wherein the selected frequency is close in value to the frequency in the set of fine frequencies;
for each data block of the set of data blocks selecting I and Q correlation values corresponding to each coarse frequency to be the selected I and Q correlation values for the corresponding data block and coarse frequency;
selecting weights for the selected I and Q correlation values, based on a difference between a frequency in the set of fine frequencies and the corresponding selected frequency in the set of coarse frequencies, and also based on a position of the data block that corresponds to the selected pair of I and Q correlation values;
weighting the selected pairs of I and Q correlation values according to the selected weights to produce weighted pairs of I and Q correlation values;
computing an approximation to the I and Q correlation integrals over the entire data associated with the received signal, for each frequency in the set of fine frequencies, using the weighted pairs of I and Q correlation values; and
estimating the carrier frequency from within the set of fine frequencies by using the approximations to the I and Q correlation integrals at the frequencies in the set of fine frequencies.

28. The method of claim 27 wherein all of the data blocks comprising the set of data blocks have the same length.

29. The method of claim 28, wherein the number of coarse frequencies is proportional to the length of the data blocks.

30. The method of claim 29 wherein the received signal is a GPS signal.

31. The method of claim 27 wherein the length of the data blocks comprising the set of data blocks is chosen to minimize a measure of computational complexity.

32. The method of claim 27 wherein the set of data that is associated with the received signal comprises sampled data obtained by sampling the received signal.

33. The method of claim 32 wherein the received signal is a GPS signal.

34. The method of claim 27 wherein the set of data that is associated with the received signal is an analog signal.

35. The method of claim 34 wherein the received signal is a GPS signal.

36. The method of claim 27 wherein the received signal is a GPS signal.

37. The method of claim 36 wherein calculating I and Q correlation values is performed coherently based on navigation bit information associated with a global positioning satellite vehicle.

38. The method of claim 36 wherein the set of fine frequencies is determined on the basis of an intermediate frequency employed by a receiver and a Doppler shift associated with a global positioning satellite vehicle.

39. The method of claim 36 wherein the set of coarse frequencies is determined on the basis of an intermediate frequency employed by a receiver and a Doppler shift associated with a global positioning satellite vehicle.

40. The method of claim 27, wherein the number of data blocks in the set of data blocks is proportional to a length of the received signal.

41. The method of claim 40 wherein the received signal is a GPS signal.

42. The method of claim 27, wherein the number of fine frequencies is proportional to the length of the data associated with the received signal.

43. The method of claim 42 wherein the received signal is a GPS signal.

44. The method of claim 27, wherein the step of computing the approximation to the I and Q correlation integrals comprises the steps of:
   Step A: zero-padding the weighted pairs of I and Q correlation values;
   Step B: applying a Fast Fourier Transform on the zero-padded weighted pairs of I and Q correlation values; and
   Step C: selecting the values of the Fast Fourier transform at appropriate frequencies to be the approximations to the I and Q correlation integrals at the frequencies in the set of fine frequencies.

45. The method of claim 44 wherein the received signal is a GPS signal.

46. The method of claim 44 wherein a number of zeros introduced during Step A is determined by a frequency resolution associated with the set of fine frequencies.

47. The method of claim 46 wherein the received signal is a GPS signal.

48. The method of claim 44 wherein the Steps A, B, and C are carried out for each hypothesized delay value over a range of hypothesized delay values.

49. The method of claim 48 wherein the step of estimating the carrier frequency from within the set of fine frequencies comprises the steps of:
   calculating a magnitude of the approximations to the I and Q correlation integrals for each frequency within the set of fine frequencies and for each hypothesized delay; and
   selecting the hypothesized delay and carrier frequency that has the highest magnitude calculation.

50. The method of claim 49 wherein the received signal is a GPS signal.

51. The method of claim 49 wherein the received signal is a GPS signal.

52. The method of claim 49 wherein the highest magnitude is compared against a threshold.

53. The method of claim 52 wherein the received signal is a GPS signal.

54. The method of claim 27, wherein for each data block in the set of data blocks, the step of calculating I and Q correlation values comprises calculating the I and Q correlation values for each hypothesized delay value over a range of hypothesized delay values.

55. The method of claim 54 wherein the received signal is a GPS signal.

* * * * *